(12) United States Patent
Yoshioka et al.

(10) Patent No.: US 10,505,210 B2
(45) Date of Patent: Dec. 10, 2019

(54) FUEL CELL SYSTEM

(71) Applicant: AISAN KOGYO KABUSHIKI KAISHA, Obu-shi, Aichi-ken (JP)

(72) Inventors: Mamoru Yoshioka, Nagoya (JP); Naruto Ito, Nisshin (JP); Makoto Fukui, Nagoya (JP); Hiroshi Sugiura, Nagoya (JP); Toshiyuki Fujimura, Obu (JP); Kasumi Mishima, Toyoake (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 200 days.

(21) Appl. No.: 15/639,517

(22) Filed: Jun. 30, 2017

(65) Prior Publication Data

US 2018/0034086 A1 Feb. 1, 2018

(30) Foreign Application Priority Data

Jul. 28, 2016 (JP) .................................. 2016-148974
Mar. 6, 2017 (JP) .................................. 2017-041580

(51) Int. Cl.
| | |
|---|---|
| *H01M 8/00* | (2016.01) |
| *H01M 8/04746* | (2016.01) |
| *H01M 8/04111* | (2016.01) |
| *H01M 8/04082* | (2016.01) |
| *H01M 8/0438* | (2016.01) |
| *H01M 8/04303* | (2016.01) |
| *F16K 1/20* | (2006.01) |
| *F16K 31/04* | (2006.01) |

(52) U.S. Cl.
CPC ....... *H01M 8/04753* (2013.01); *F16K 1/2057* (2013.01); *H01M 8/04111* (2013.01); *H01M 8/04201* (2013.01); *H01M 8/04303* (2016.02); *H01M 8/04388* (2013.01); *F16K 31/047* (2013.01); *H01M 2250/20* (2013.01)

(58) Field of Classification Search
CPC ......... H01M 8/04753; H01M 8/04089; H01M 8/043; H01M 8/04388; H01M 8/04111; H01M 8/04303; H01M 8/04201; H01M 2250/20; F16K 1/2028; F16K 1/2007; F16K 1/2057; F16K 31/047; Y02T 90/32
See application file for complete search history.

(56) References Cited

U.S. PATENT DOCUMENTS

2016/0290513 A1* 10/2016 Asanuma ............... F02M 26/48

FOREIGN PATENT DOCUMENTS

| JP | 2010-192251 A | 9/2010 | |
|---|---|---|---|
| JP | 2017-162759 A | 9/2017 | |
| WO | WO-2015098954 A1 * | 7/2015 | ............. F02M 26/48 |

* cited by examiner

*Primary Examiner* — Nicholas P D'Aniello
(74) *Attorney, Agent, or Firm* — Oliff PLC

(57) ABSTRACT

A fuel cell system uses, as an inlet sealing valve, an eccentric valve having a rubber seat provided with a seal part having such a shape as to increase the surface pressure of a portion in contact with a seal surface of a valve element when pressure in an air supply passage rises. Each of an outlet integration valve and a bypass valve is constituted of an eccentric valve basically identical in structure to the inlet sealing valve. When supply of air to a fuel cell stack is to be stopped during deceleration of a vehicle, a controller closes the inlet sealing valve and opens the bypass valve and, after the inlet sealing valve is fully closed, closes the bypass valve.

8 Claims, 29 Drawing Sheets

FUEL CELL SYSTEM

CROSS-REFERENCE TO RELATED APPLICATIONS

This application is based upon and claims the benefit of priority from the prior Japanese Patent Applications No. 2016-148974 filed on Jul. 28, 2016 and No. 2017-041580 filed on Mar. 6, 2017, the entire contents of which are incorporated herein by reference.

BACKGROUND

Technical Field

The present disclosure relates to a fuel cell system provided with a fuel cell which generates electric power upon receipt of supply of fuel gas and oxidant gas and, more particularly, to a fuel cell system suitable to be mounted in fuel-cell vehicles.

Related Art

As one of conventional arts, there is a fuel cell system disclosed in Japanese patent application publication No. 2010-192251. This fuel cell system is provided with a fuel cell stack (fuel cells), a gas supply passage for supplying oxidant gas to the fuel cell stack, an upstream-side valve for controlling supply of the oxidant gas to the fuel cell stack, a compressor provided in the gas supply passage, a gas exhaust passage for exhausting the oxidant gas from the fuel cell stack, a downstream-side valve for controlling the exhaust of the oxidant gas from the fuel cell stack, a bypass passage for exhausting the oxidant gas to the gas exhaust passage by detouring around the fuel cell stack, and a bypass valve provided in the bypass passage and configured to regulate a flow rate of the oxidant gas to be made to flow in the bypass passage.

Further, it is conceivable to apply an eccentric valve (a flow control valve having a valve element whose seal surface is placed eccentrically from a rotary shaft) as the downstream-side valve in the aforementioned fuel cell system. In this case, this downstream-side valve may be configured to make a valve element tightly contact with, i.e. press against, a seal part provided in a valve seat to sealingly close a gas exhaust passage, thereby stopping supply of oxidant gas to a fuel cell.

SUMMARY

Technical Problems

However, in the aforementioned fuel cell system in which the downstream-side valve has a sealing function, when supply of oxidant gas to the fuel cell is stopped, surplus (unnecessary) oxidant gas is apt to be supplied to the fuel cell. This causes a reaction between that oxidant gas and the fuel gas having been already supplied to the fuel cell, resulting in generation of electric power. During deceleration, therefore, electric power generated in the fuel cell may be redundant.

The present disclosure has been made to address the above problems and has a purpose to provide a fuel cell system capable of minimizing unnecessary power generation in a fuel cell during deceleration.

Means of Solving the Problems

To achieve the above purpose, one aspect of the present disclosure provides a fuel cell system comprising: a fuel cell; an oxidant gas supply passage for supplying oxidant gas to the fuel cell; a compressor provided in the oxidant gas supply passage and configured to supply the oxidant gas to the fuel cell; an upstream-side valve provided in the oxidant gas supply passage between the compressor and the fuel cell; an oxidant gas exhaust passage for exhausting the oxidant gas supplied to the fuel cell; a downstream-side valve provided in the oxidant gas exhaust passage; a bypass passage connected to the oxidant gas supply passage and the oxidant gas exhaust passage; a bypass valve provided in the bypass passage and configured to control a flow rate of the oxidant gas to be allowed to flow in the bypass passage; and a controller configured to execute various controls; wherein the upstream-side valve includes: a valve seat including a valve hole and a seat surface formed at an edge of the valve hole; a valve element including an outer periphery formed with a seal surface corresponding to the seat surface; a rotary shaft integrally provided with the valve element to rotate the valve element; a drive mechanism configured to generate a driving force to rotate the rotary shaft in a valve opening direction; a driving force receiving part integrally provided with the rotary shaft and configured to receive the driving force; a bearing placed in a position between the valve element and the driving force receiving part in an extending direction of a central axis of the rotary shaft and configured to support the rotary shaft; and a return spring to generate a return spring force to rotate the rotary shaft in a valve closing direction, the central axis of the rotary shaft extends in parallel to a diameter direction of the valve element and is placed eccentrically from a center of the valve hole to a radial direction of the valve hole, and the seal surface is placed eccentrically from the central axis of the rotary shaft to a direction in which a central axis of the valve element extends, one of the valve seat and the valve element is provided with a seal member configured to seal between the valve element and the valve seat during non-operation of the drive mechanism, and the seal member includes a seal part having a shape that increases surface pressure of a portion in contact with an other one of the valve element and the valve seat as an upstream-side pressure of the upstream-side valve becomes higher than a downstream-side pressure of the upstream-side valve.

In the above fuel cell system, the upstream-side valve is provided with the seal member to seal between the valve element and the valve seat during non-operation of the drive mechanism. The seal member includes the seal part having such a shape as to increase the surface pressure of a portion in contact with the other one of the valve element and the valve seat as the upstream-side pressure of the upstream-side valve becomes larger than the downstream-side pressure. Accordingly, when supply of oxidant gas to the fuel cell is to be stopped, the upstream-side valve is fully closed to increase the upstream-side pressure of the upstream-side valve more than the downstream-side pressure, thereby enabling sealing the oxidant gas on an inlet side of the fuel cell. Consequently, when supply of the oxidant gas to the fuel cell is stopped, supply of surplus (unnecessary) oxidant gas to the fuel cell can be reduced. This can minimize unnecessary power generation in the fuel cell during deceleration.

DETAILED DESCRIPTION OF THE EXEMPLARY EMBODIMENTS

A detailed description of an embodiment of a fuel cell system which is one of typical embodiments of this disclosure will now be given referring to the accompanying drawings. In the present embodiment described below, the fuel cell system of the present disclosure is applied to a fuel cell system to be mounted in a fuel cell vehicle to supply electric power to a driving motor (not shown).

Figure 1:
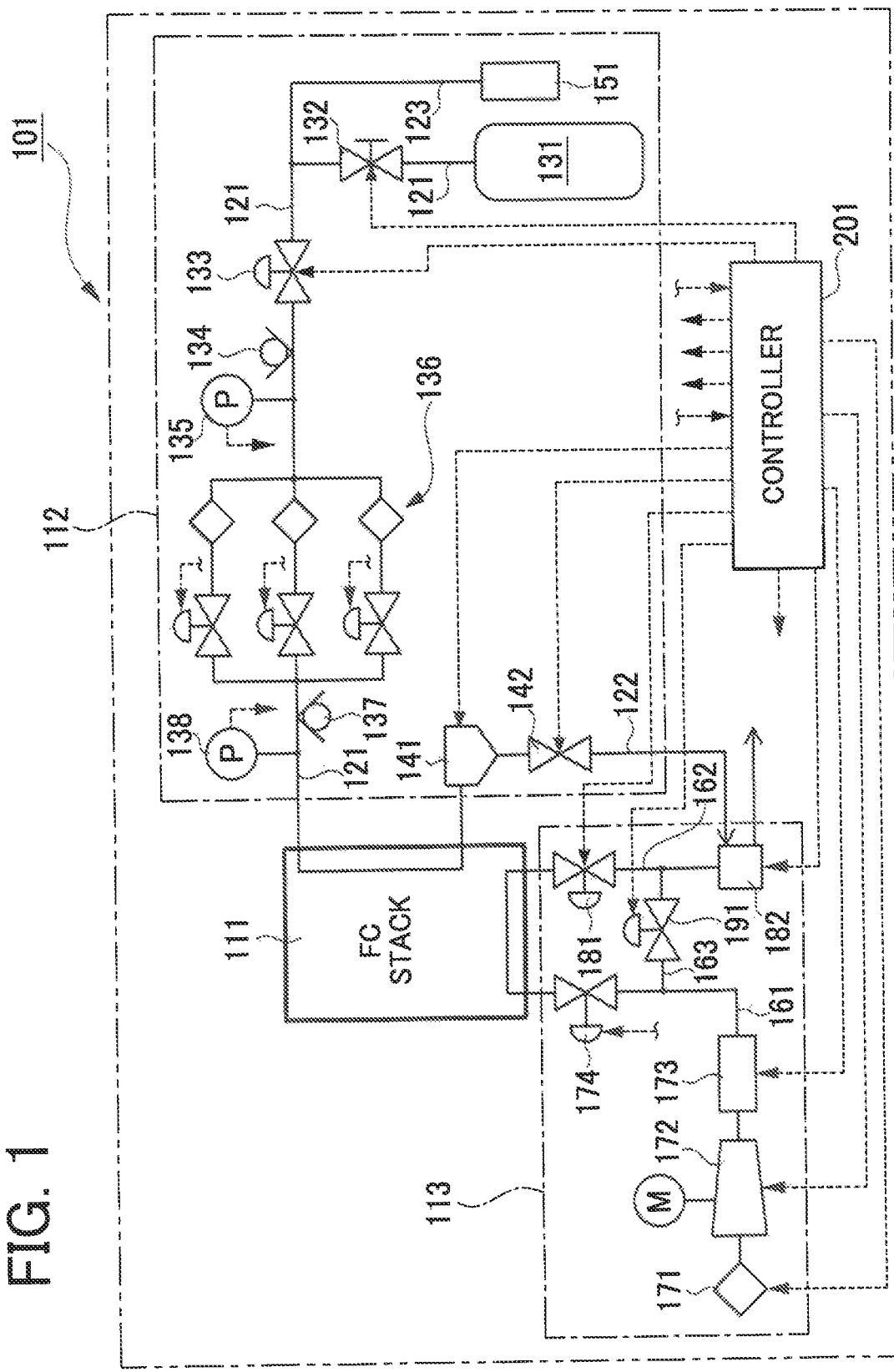
FIG. 1 is a schematic configuration view of a fuel cell system in an embodiment.

As shown in FIG. 1, a fuel cell system 101 in the present embodiment includes a fuel cell stack (fuel cells) 111, a hydrogen system 112, and an air system 113.

The fuel cell stack 111 generates electricity upon receipt of supply of fuel gas and supply of oxidant gas. In the present embodiment, the fuel gas is hydrogen gas and the oxidant gas is air. Specifically, the fuel cell stack 111 is configured to produce electric power upon receipt of hydrogen gas supplied from the hydrogen system 112 and air supplied from the air system 113. The electric power generated in the fuel cell stack 111 will be supplied to a drive motor (not shown) through an inverter (not shown).

The hydrogen system 112 is provided on an anode side of the fuel cell stack 111. This hydrogen system 112 is provided with a hydrogen supply passage 121, a hydrogen exhaust passage 122, and a filling passage 123. The hydrogen supply passage 121 is a flow passage to supply hydrogen gas from a hydrogen tank 131 to the fuel cell stack 111. The hydrogen exhaust passage 122 is a flow passage to exhaust hydrogen gas to be discharged out of the fuel cell stack 111 (hereinafter, appropriately referred to as "hydrogen offgas"). The filling passage 123 is a flow passage to fill hydrogen gas into the hydrogen tank 131 through a fill port 151.

The hydrogen system 112 includes, on the hydrogen supply passage 121, a main stop valve 132, a high-pressure regulator 133, a medium-pressure relief valve 134, a pressure sensor 135, an injector part 136, a low-pressure relief valve 137, and a pressure sensor 138, which are arranged from a side close to the hydrogen tank 131. The main stop valve 132 is a valve for switching supply and shutoff of hydrogen gas from the hydrogen tank 131 to the hydrogen supply passage 121. The high-pressure regulator 133 is a pressure regulating valve to reduce the pressure of hydrogen gas. The medium-pressure relief valve 134 is a valve configured to open when the pressure between the high-pressure regulator 133 and the injector part 136 becomes a predetermined pressure or higher in order to regulate the pressure to below the predetermined pressure. The pressure sensor 135 is a sensor to detect the pressure in the hydrogen supply passage 121 between the high-pressure regulator 133 and the injector part 136. The injector part 136 is a mechanism for regulating a flow rate of hydrogen gas. The low-pressure relief valve 137 is a valve configured to open when the pressure in the hydrogen supply passage 121 between the injector part 136 and the fuel cell stack 111 becomes a predetermined pressure or higher in order to regulate the pressure to below the predetermined pressure. The pressure sensor 138 is a sensor to detect the pressure in the hydrogen supply passage 121 between the injector part 136 and the fuel cell stack 111.

The hydrogen system 112 further includes, on the hydrogen exhaust passage 122, a gas-liquid separator 141 and an exhaust-drain valve 142 arranged in this order from a side close to the fuel cell stack 111. The gas-liquid separator 141 is a device to separate moisture from the hydrogen offgas. The exhaust-drain valve 142 is a valve to switch exhaust and shutoff of hydrogen offgas and moisture from the gas-liquid separator 141 to a diluter 182 of the air system 113.

The air system 113 is provided on a cathode side of the fuel cell stack 111. This air system 113 is provided with an air supply passage 161, an air exhaust passage 162, and a bypass passage 163. The air supply passage 161 is a flow passage to supply air from the outside of the fuel cell system 101 into the fuel cell stack 111. The air exhaust passage 162 is a flow passage to exhaust air discharged out of the fuel cell stack 111 (hereinafter, appropriately referred to as "air offgas"). The bypass passage 163 is a flow passage to allow air to flow from the air supply passage 161 to the air exhaust passage 162 without passing through the fuel cell stack 111.

The air system 113 further includes an air cleaner 171, a compressor 172, an intercooler 173, and an inlet sealing valve (an upstream-side valve) 174, which are arranged in this order. The air cleaner 171 is a device to clean up air externally taken in the fuel cell system 101. The compressor 172 is a device to supply air to the fuel cell stack 111. The intercooler 173 is a device to cool air. The inlet sealing valve 174 is a sealing valve to switch supply and shutoff of air flow to the fuel cell stack 111. The inlet sealing valve 174 in the present embodiment is an eccentric valve in which a seal surface of a valve element is placed eccentrically from a rotary shaft.

The air system 113 further includes, on the air exhaust passage 162, an outlet integration valve (a downstream-side valve) 181 and a diluter 182 arranged in this order from a side close to the fuel cell stack 111.

The outlet integration valve 181 is a valve (a valve having a function of pressure regulation (flow control)) to regulate the back pressure of the fuel cell stack 111 to thereby control an exhaust amount of air offgas from the fuel cell stack 111. The outlet integration valve 181 in the present embodiment is an eccentric valve substantially identical in structure (a rubber seat 21 is different in structure) to the inlet sealing valve 174. This outlet integration valve 181 will be described in detail later.

The diluter 182 is a device to dilute hydrogen offgas exhausted from the hydrogen exhaust passage 122 by the air offgas and the air flowing through the bypass passage 163.

The air system 113 further includes a bypass valve 191 on the bypass passage 163. The bypass valve 191 is a valve to control a flow rate of air in the bypass passage 163. The bypass valve 191 in the present embodiment is an eccentric valve substantially identical in structure (excepting the absence of the rubber seat 21) to the inlet sealing valve 174 and the outlet integration valve 181. This bypass valve 191 will be described in detail later.

The fuel cell system 101 is further provided with a controller (a controller) 201 to control the system. Specifically, the controller 201 is configured to control each part or device of the fuel cell system 101 and perform various determinations. In addition, the fuel cell system 101 also includes a cooling system (not shown) to cool the fuel cell stack 111.

In the fuel cell system 101 configured as above, the hydrogen gas supplied from the hydrogen supply passage 121 to the fuel cell stack 111 is consumed in the fuel cell stack 111 to generate electric power and thereafter is exhausted as hydrogen offgas from the fuel cell stack 111 to the outside of the fuel cell system 101 through the hydrogen exhaust passage 122 and the diluter 182. The air supplied from the air supply passage 161 to the fuel cell stack 111 is consumed in the fuel cell stack 111 to generate electric power and then is exhausted as air offgas from the fuel cell stack 111 to the outside of the fuel cell system 101 through the air exhaust passage 162 and the diluter 182.

Herein, the inlet sealing valve 174, the outlet integration valve 181, and the bypass valve 191 will be described below with reference to FIGS. 2 to 21. Those valves are basically identical in structure excepting that the inlet sealing valve 174 and the outlet integration valve 181 may be different in structure of a rubber seat and that the bypass valve 191 includes no rubber seat. Thus, the following explanation will be given with a focus on the inlet sealing valve 174, and explanations of the outlet integration valve 181 and the bypass valve 191 are appropriately added.

Figure 2:
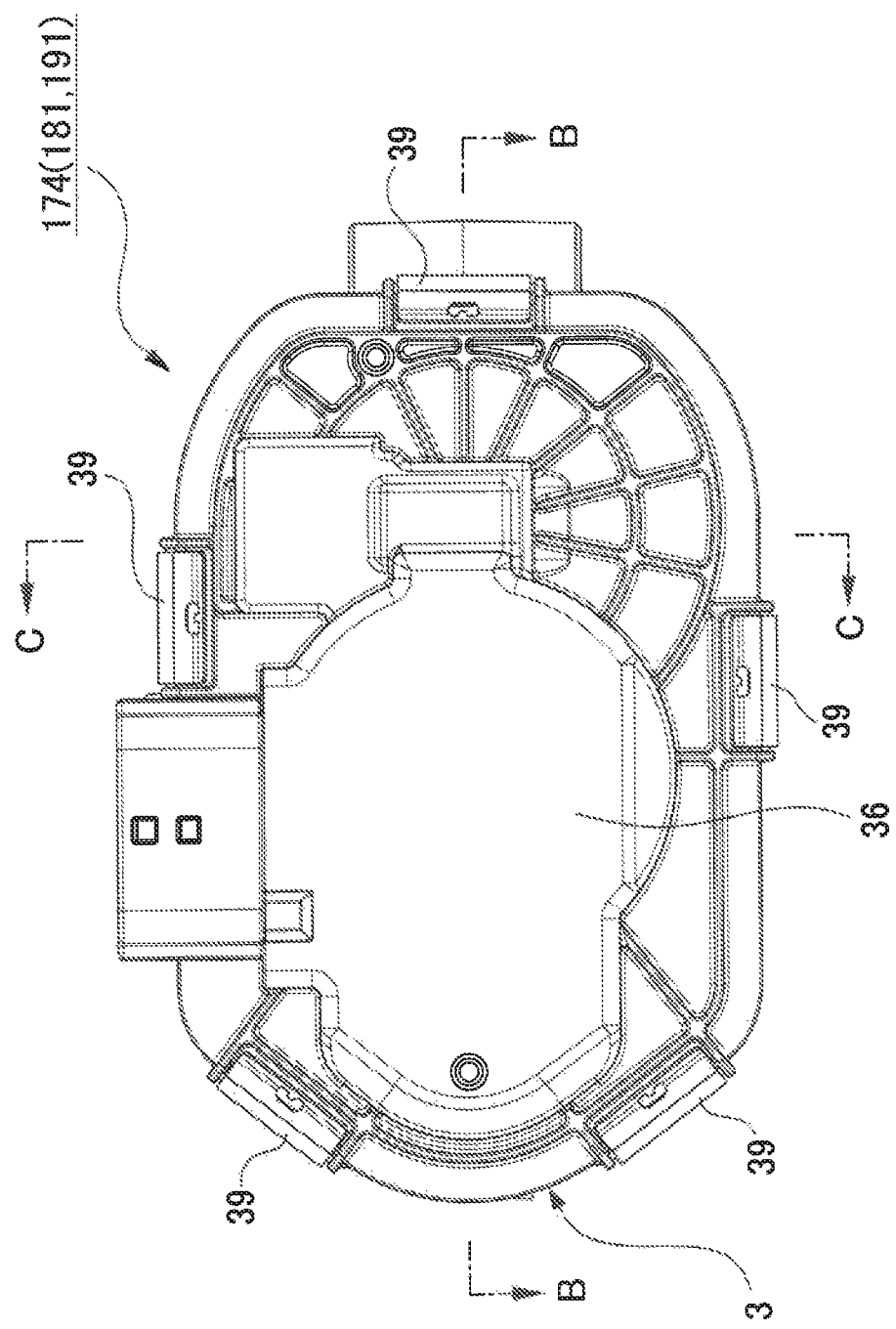
FIG. 2 is a front view of an inlet sealing valve.
Figure 3:
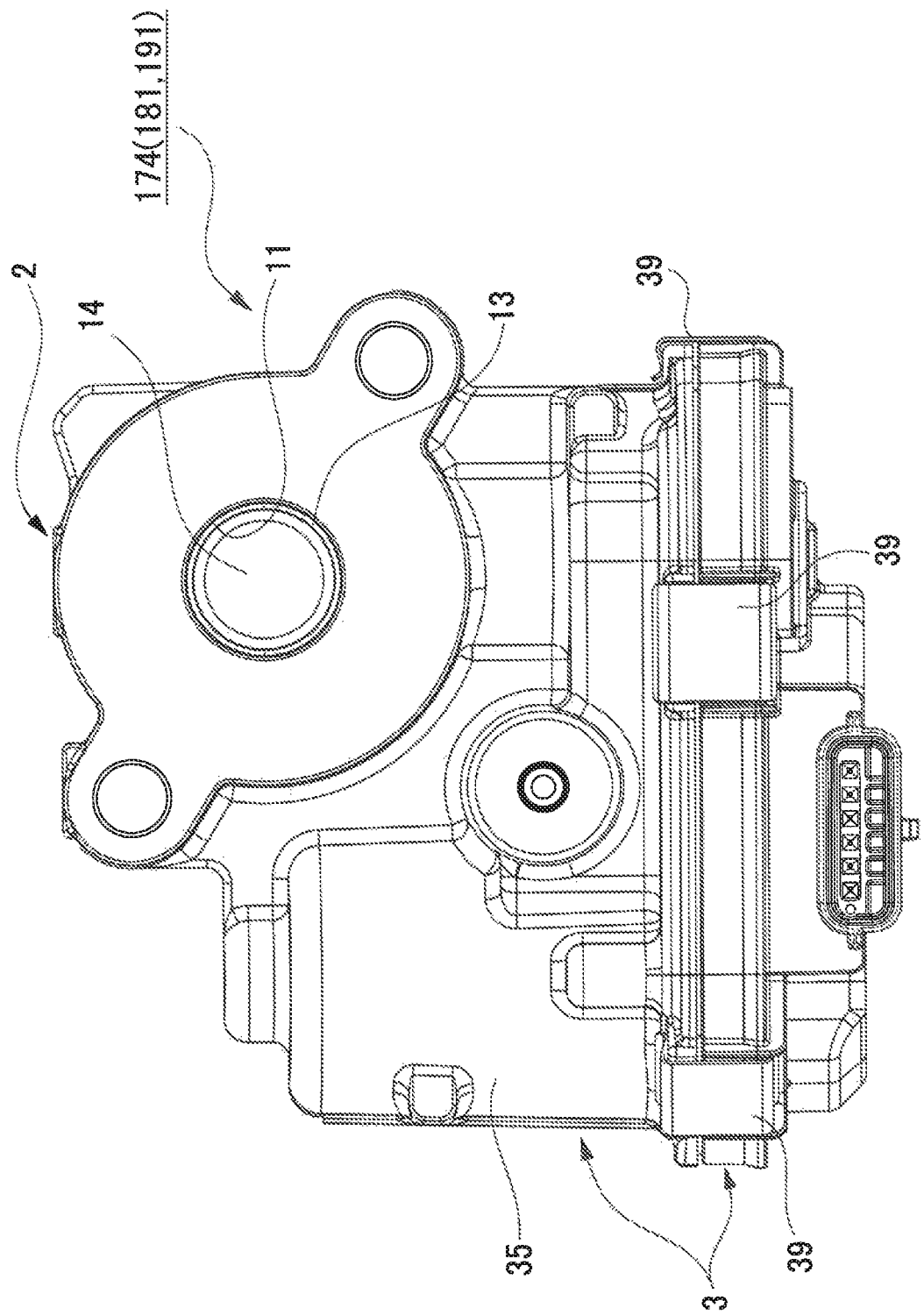
FIG. 3 is a plan view of the inlet sealing valve.

As shown in FIGS. 2 and 3, the inlet sealing valve 174 is provided with a valve section 2 and a drive mechanism section 3. The valve section 2 includes a pipe part 12 (see FIG. 8) having a passage 11 for allowing air (atmospheric air) to flow. In this passage 11, there are placed a valve seat 13, a valve element 14, and a rotary shaft 15. The rotary shaft 15 receives a driving force (torque) transmitted from the drive mechanism section 3. This drive mechanism section 3 includes a motor 32 and a speed-reducing mechanism 33 (see FIGS. 8 and 9).

Figure 4:
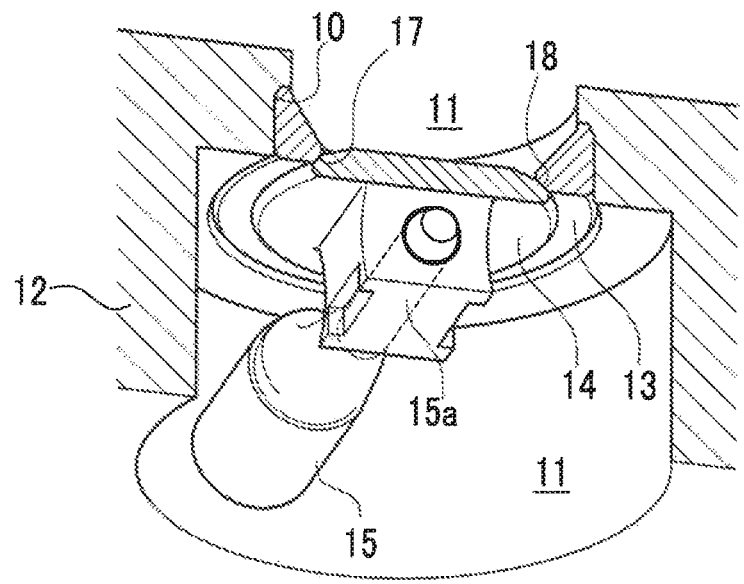
FIG. 4 is a partially-cutaway perspective view of a valve section in a valve-closed state (a fully-closed state) in which a valve element is in contact with a valve seat.
Figure 5:
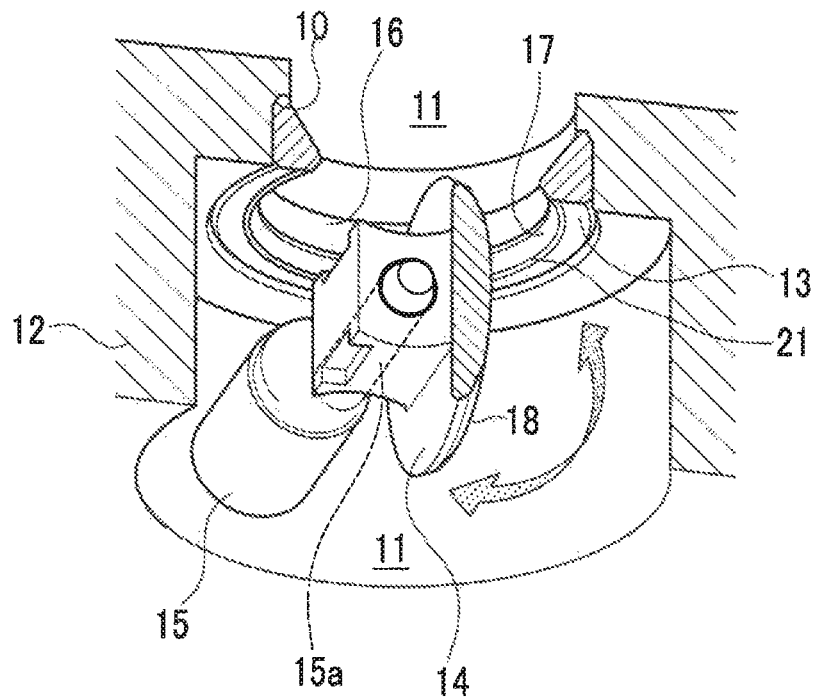
FIG. 5 is a partially-cutaway perspective view of the valve section in a valve open state in which the valve element is most away from the valve seat.

As shown in FIGS. 4 and 5, the passage 11 is formed with a recessed shoulder 10 in which the valve seat 13 is fitted. The valve seat 13 has a circular ring shape formed with a valve hole 16 at the center. The valve hole 16 is formed, at its circumferential edge, with an annular seat surface 17. The valve element 14 includes a circular disc-shaped portion whose outer periphery has an annular seal surface 18 corresponding to, that is, to be brought in contact with, the seat surface 17. The valve element 14 is integrally provided with the rotary shaft 15 and rotatable together with the rotary shaft 15.

Figure 21:
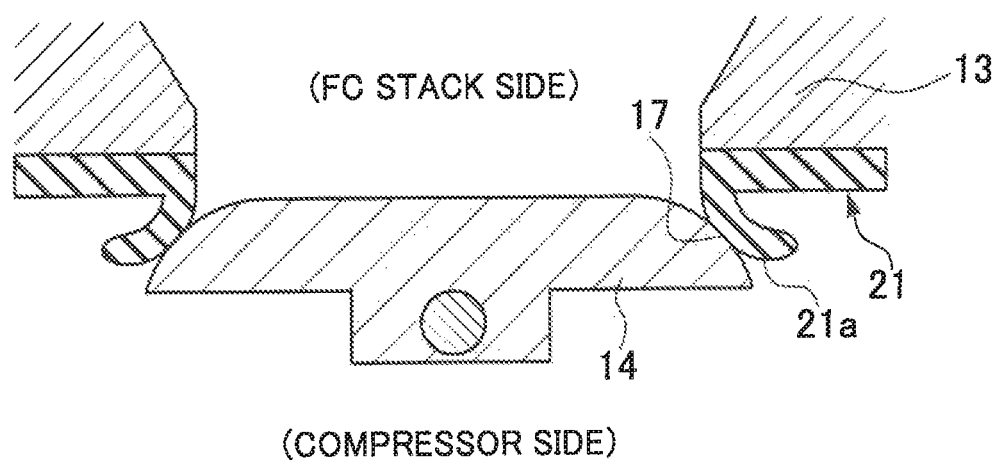
FIG. 21 is a cross-sectional view of a part of a rubber seat.

In the present embodiment, the valve seat 13 is provided with a rubber seat (a seal member) 21 (see FIG. 21). The seat surface 17 is formed in this rubber seat 21. The details of the rubber seat 21 will be described later. In the bypass valve 191 that is not provided with the rubber seat 21, the seat surface 17 is formed in the valve seat 13.

In the present embodiment, referring to FIGS. 4 and 5, the inlet sealing valve 174 is configured such that the passage 11 formed on an opposite side (i.e., an upper side in the figures) to the valve element 14 and the rotary shaft 15 with respect to the valve seat 13 is located on a side close to the fuel cell stack 111 (on a downstream side of air flow), while the passage 11 formed on a side (i.e., a lower side in the figures) close to the valve element 14 and the rotary shaft 15 with respect to the valve seat 13 is located on a side close to a compressor (on an upstream side of air flow). In other words, in the present embodiment, the air will flow in the passage 11 from the valve element 14 (the rotary shaft 15) side toward the valve seat 13 side.

In the outlet integration valve 181, reversely from the inlet sealing valve 174, the passage 11 formed on the opposite side to the valve element 14 and the rotary shaft 15 with respect to the valve seat 13 is located on the side close to the fuel cell stack 11 (on an upstream side of air flow), while the passage 11 formed on the side close to the valve element 14 and the rotary shaft 15 with respect to the valve seat 13 is located on a side close to the diluter 182 (on a downstream side of air flow). In other words, in the outlet integration valve 181, the air will flow in the passage 11 from the valve seat 13 side toward the valve element 14 (the rotary shaft 15) side.

In the bypass valve 191, furthermore, the passage 11 formed on the opposite side to the valve element 14 and the rotary shaft 15 with respect to the valve seat 13 is located on a side close to the air exhaust passage 162 (on a downstream side of air flow), while the passage 11 formed on the side close to the valve element 14 and the rotary shaft 15 with respect to the valve seat 13 is located on a side close to the air supply passage 161 (on an upstream side of air flow). In other words, in the bypass valve 191, the air will flow in the passage 11 from the valve element 14 (the rotary shaft 15) side toward the valve seat 13 side.

Figure 6:
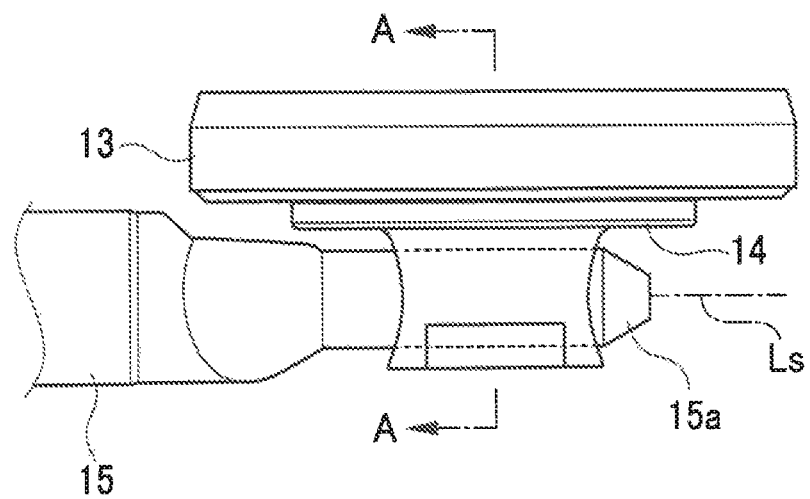
FIG. 6 is a side view of the valve seat, the valve element, and a rotary shaft in the inlet sealing valve in a valve-closed state.
Figure 7:
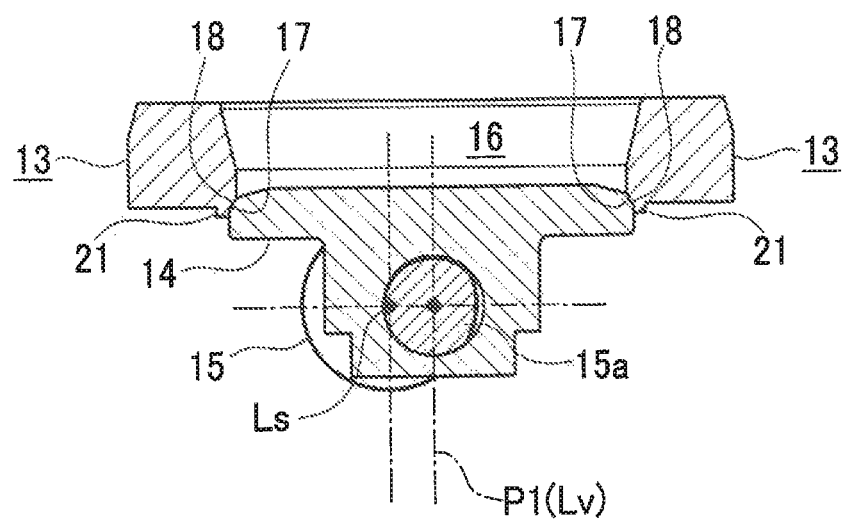
FIG. 7 is a cross sectional view taken along a line A-A in FIG. 6.

As shown in FIGS. 6 and 7, the central axis Ls of the rotary shaft 15 extends in parallel to the diameter of the valve element 14 (more concretely, the diameter of the disc-shaped portion of the valve element 14) and is positioned eccentrically from the central axis P1 of the valve hole 16 to one side in a radial direction of the valve hole 16. The seal surface 18 of the valve element 14 is positioned eccentrically from the central axis Ls of the rotary shaft 15 to an extending direction of the central axis Lv of the valve element 14.

By rotation of the valve element 14 about the central axis Ls of the rotary shaft 15, the valve element 14 is movable between a valve-closing position in which the seal surface 18 of the valve element 14 is in surface contact with the seat surface 17 (see FIG. 4) and a fully-opened position in which the seal surface 18 is most away from the seat surface 17 (see FIG. 5).

Figure 8:
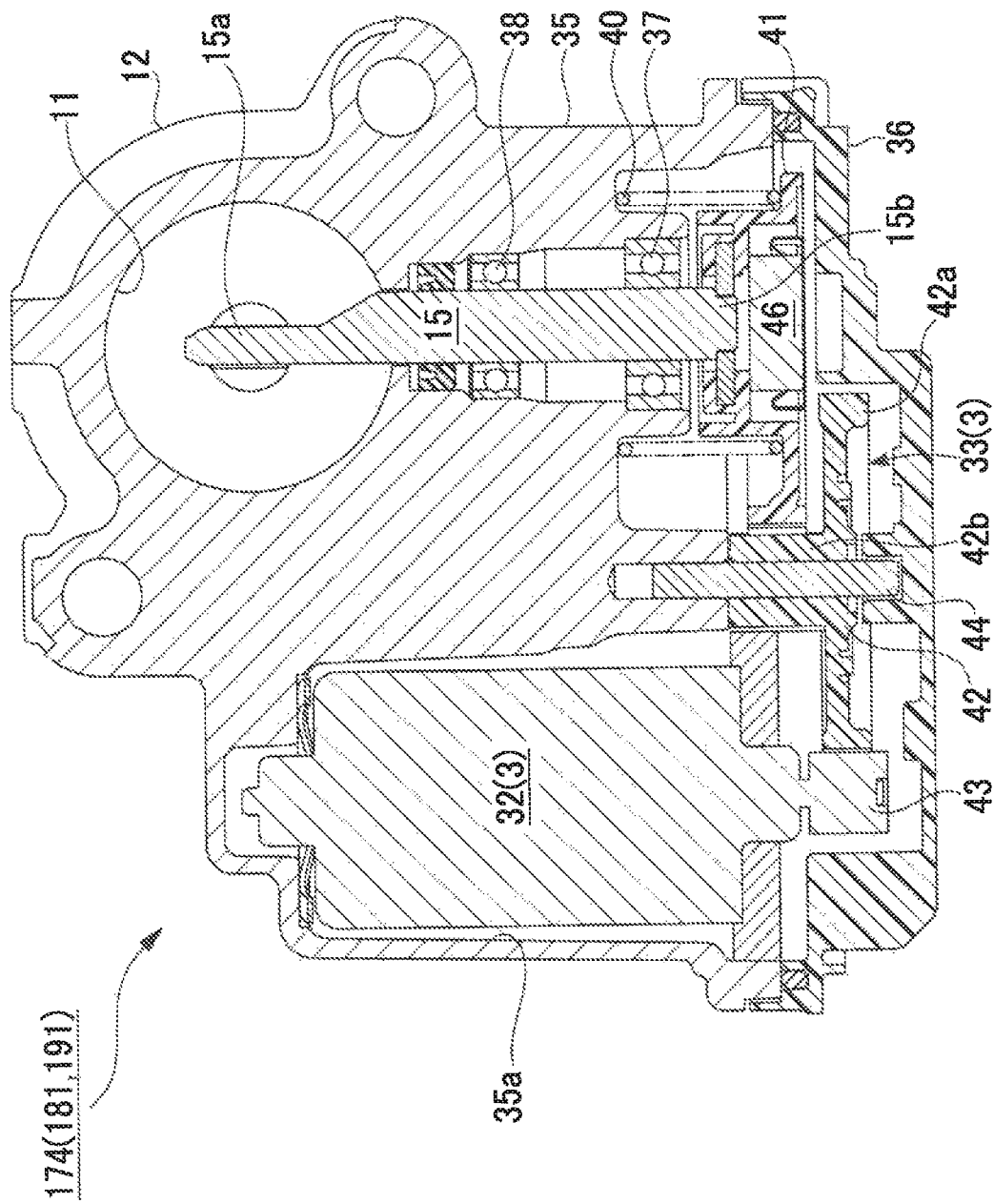
FIG. 8 is a cross sectional view taken along a line B-B in FIG. 2.
Figure 9:
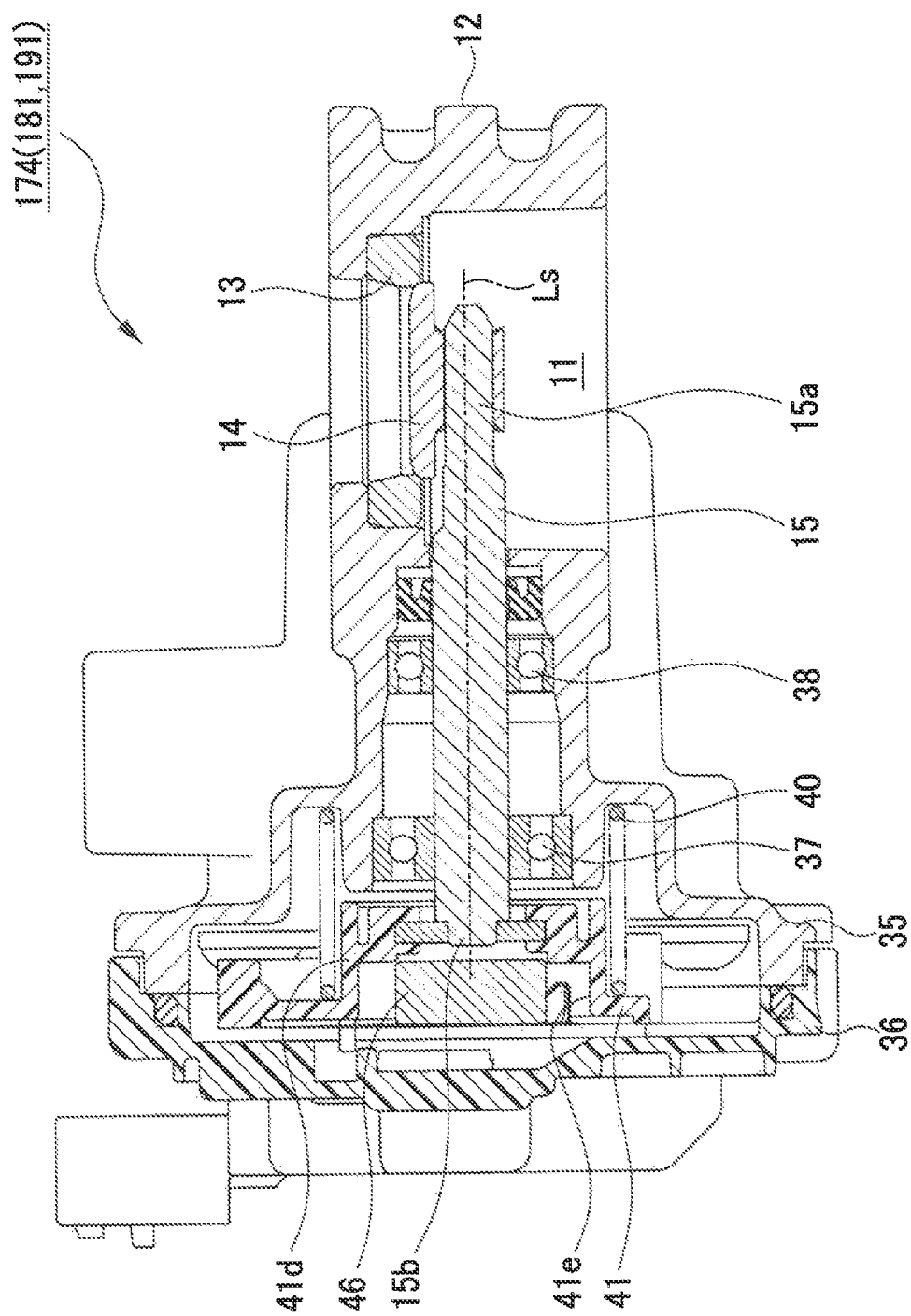
FIG. 9 is a cross sectional view taken along a line C-C in FIG. 2.
Figure 10:
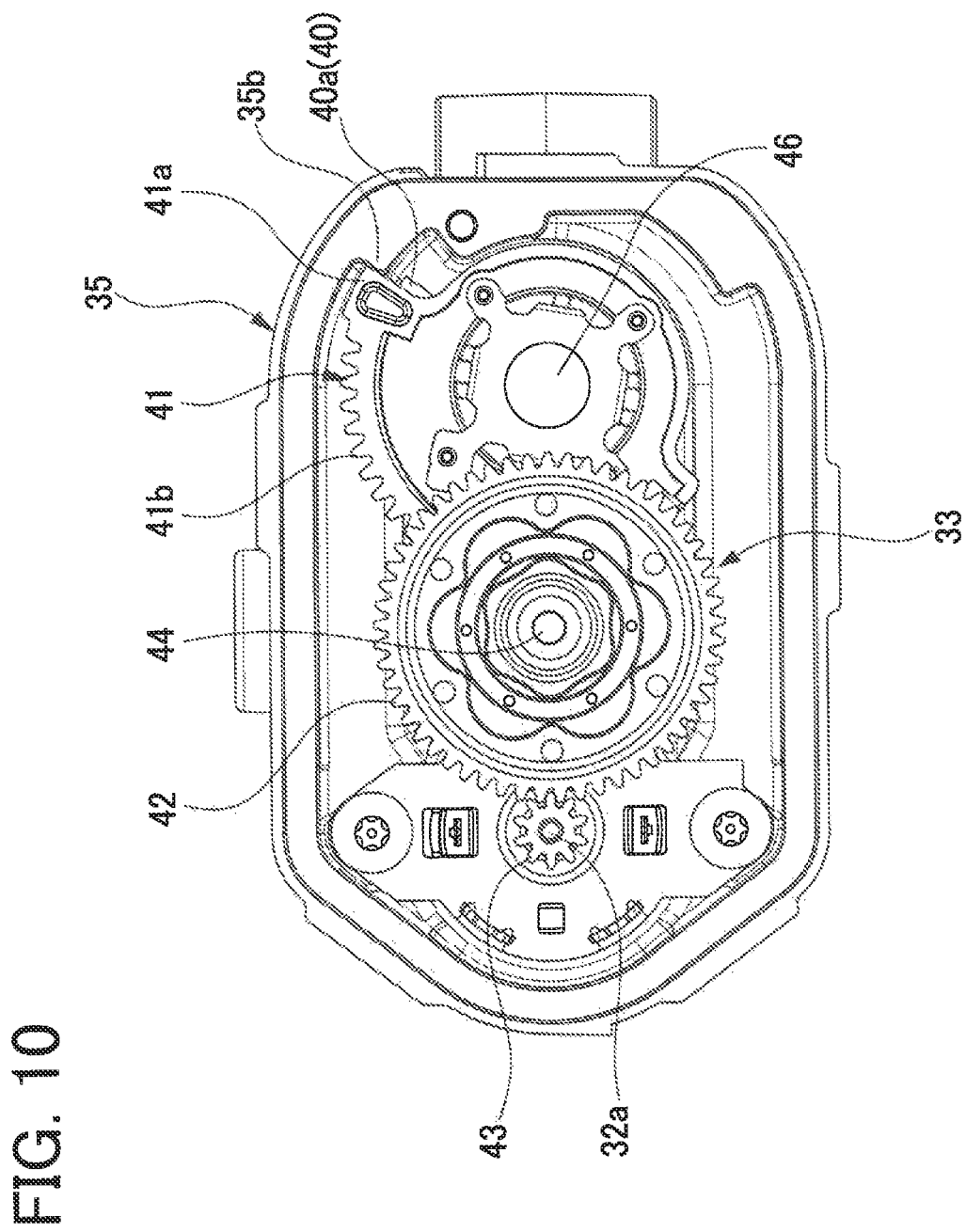
FIG. 10 is a front view showing a state in which an end frame is removed from a valve housing.

As shown in FIGS. 8 and 9, a valve housing 35 made of either metal or synthetic resin is provided with the passage 11 and the pipe part 12. An end frame 36 made of either metal or synthetic resin closes an open end of the valve housing 35. The valve element 14 and the rotary shaft 15 are placed in the valve housing 35. The rotary shaft 15 includes a pin 15a in its distal end portion. The pin 15a specifically is provided at one end of the rotary shaft 15 in a direction of the central axis Ls (on the side close to the valve element 14). The pin 15a has a diameter smaller than a diameter of a part of the rotary shaft 15 other than the pin 15a. At the other end of the rotary shaft 15 (on the side close to the main gear 41) in the direction of the central axis Ls, there is provided with a proximal end portion 15b.

The distal end portion of the rotary shaft 15 formed with the pin 15a is a free distal end which is inserted and placed in the passage 11 of the pipe part 12. The rotary shaft 15 is supported in cantilever configuration through two bearings arranged apart from each other, that is, a first bearing 37 and a second bearing 38, so that the rotary shaft 15 is rotatable with respect to the valve housing 35. The first bearing 37 and the second bearing 38 are each constituted of a ball bearing. Those first and second bearings 37 and 38 are placed between the valve element 14 and the main gear 41 in the direction of the central axis Ls of the rotary shaft 15 to rotatably support the rotary shaft 15. In the present embodiment, the first bearing 37 is located at a position on a side close to the main gear 41 relative to the second bearing 38. The valve element 14 is fixed by welding to the pin 15a in the distal end portion of the rotary shaft 15 and is placed in the passage 11.

The end frame 36 is secured to the valve housing 35 with a plurality of clips 39 (see FIGS. 2 and 3). As shown in FIGS. 8 and 9, to the proximal end portion 15b of the rotary shaft 15, the main gear 41 provided with a fan-shaped gear is fixed. A return spring 40 is provided between the valve housing 35 and the main gear 41 to produce a return spring force Fs1. This return spring force Fs1 is the force that rotates the rotary shaft 15 in a valve closing direction and that urges the valve element 14 in a valve closing direction.

Figure 11:
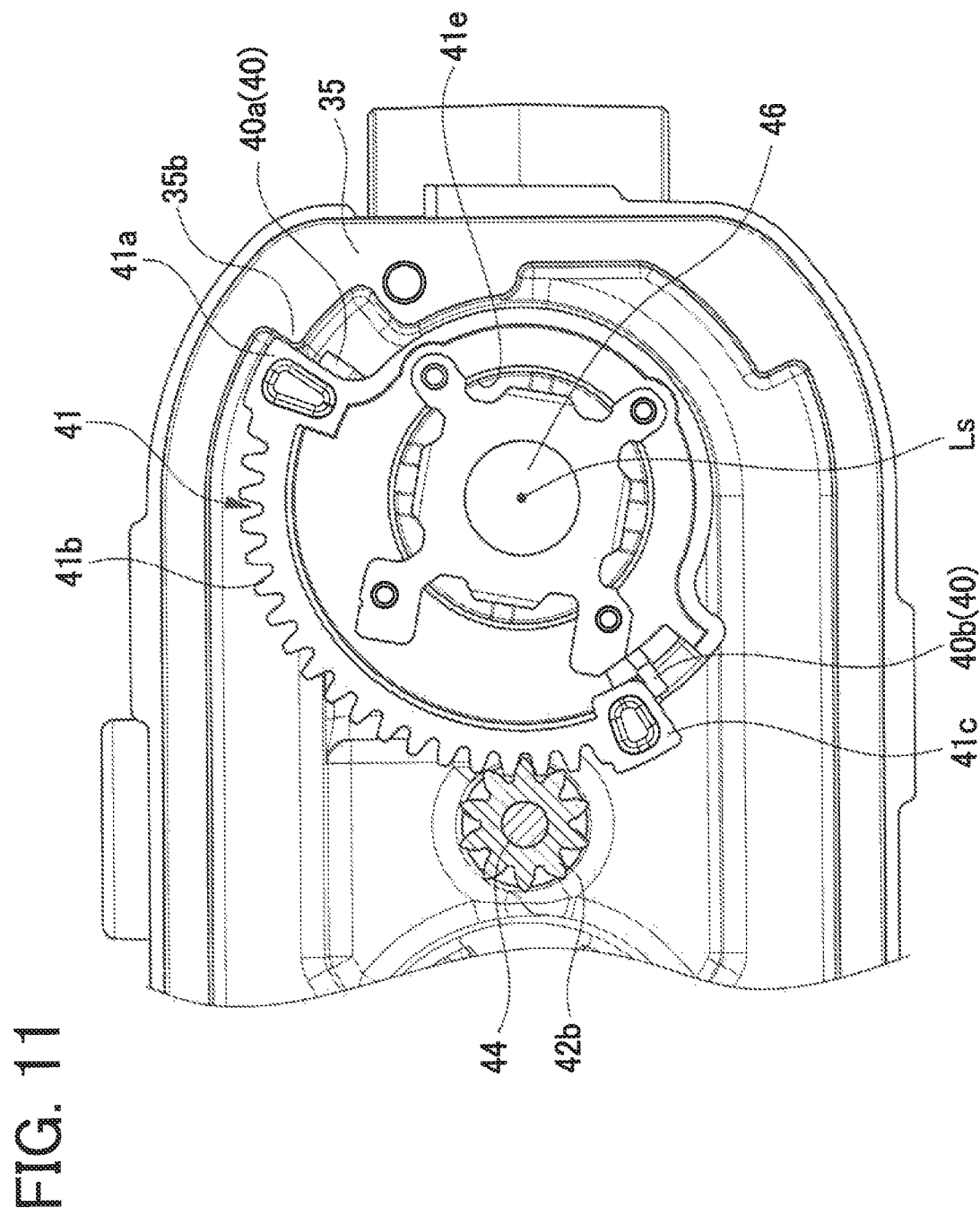
FIG. 11 is an enlarged view (a partially-cutaway cross sectional view) of a main gear, a return spring, an intermediate gear, and their surrounding parts during non-operation of a motor.

The return spring 40 is an elastic member made of wire wound in a coil shape and is provided, at both ends, with a far-side hook 40a and a near-side hook 40b as shown in FIG. 11. The far-side hook 40a and the near-side hook 40b are spaced at an interval of about 180° in a circumferential direction of the return spring 40. The far-side hook 40a is located on a side close to the valve housing 35 (on a far-side of a drawing sheet of FIG. 11) so that it contacts a spring hook part 35c (see FIG. 19) of the valve housing 35. In contrast, the near-side hook 40b is located on a side close to the main gear 41 (on a near-side of the drawing sheet of FIG. 11) so that it contacts a spring hook part 41c of the main gear 41.

As shown in FIGS. 8 to 11, the main gear 41 includes a full-close stopper part 41a, a gear part 41b, a spring hook part 41c, a spring guide part 41d, and others. In the circumferential direction (a counterclockwise direction in FIG. 11) of the main gear 41, the full-close stopper part 41a, the gear part 41b, and the spring hook part 41c are arranged in this order. The main gear 41 is integrally provided with the rotary shaft 15 and is configured to receive driving force generated by the motor 32. The full-close stopper part 41a is a part that abuts on the full-close stopper part 35b of the valve housing 35 when an opening degree θ is 0. The main gear 41 is one example of a "driving-force receiving part" in the present disclosure.

As shown in FIG. 8, the motor 32 is accommodated and fixed in a holding cavity 35a of the valve housing 35. The motor 32 is operative to generate driving force to rotate the rotary shaft 15 in a valve opening direction and a valve closing direction. The motor 32 is coupled to the rotary shaft 15 to transmit the driving force through the speed reducing mechanism 33 in order to open and close the valve element 14. Specifically, a motor gear 43 is fixed to an output shaft 32a (see FIG. 10) of the motor 32. This motor gear 43 is connected to the main gear 41 to transmit the driving force through an intermediate gear 42.

The intermediate gear 42 is a double gear having a large-diameter gear 42a and a small-diameter gear 42b and is rotatably supported by the valve housing 35 through a pin shaft 44. The diameter of the large-diameter gear 42a is larger than the diameter of the small-diameter gear 42b. The large-diameter gear 42a is drivingly engaged with the motor gear 43, while the small-diameter gear 42b is drivingly engaged with the main gear 41. In the present embodiment, the main gear 41, the intermediate gear 42, and the motor gear 43, constituting the speed reducing mechanism 33, are each made of resin.

The motor 32 is one example of a "drive mechanism" in the present disclosure. The intermediate gear 42 (a drive transmission part) transmits the driving force of the motor 32 to the rotary shaft 15.

In the inlet sealing valve 174 configured as above, when the motor 32 is energized from a state that the valve element 14 is held in a valve-closed state (in which the entire circumference of the seal surface 18 of the valve element 14 is in contact with the entire circumference of the seat surface 17 of the valve seat 13 (the rubber seat 21)) as shown in FIG. 4, even though the details will be described later, the force (the motor driving force Fm1 (see FIG. 14)) that pushes the gear teeth is exerted on the main gear 41, thereby moving the valve element 14 in a direction toward the valve seat 13 by the principle of leverage (see FIG. 15). Thereafter, when the drive voltage (current) applied to the motor 32 is gradually raised, the output shaft 32a and the motor gear 43 are rotated in a forward direction (i.e., a direction to open the valve element 14) and this rotation is reduced in speed through the intermediate gear 42 and then transmitted to the main gear 41. Accordingly, the valve element 14 is opened against the return spring force Fs1 that is generated by the return spring 40 and that urges the valve element 14 in the valve closing direction, and thus the passage 11 is opened (see FIGS. 16 and 18). Thereafter, when the drive voltage applied to the motor 32 is maintained at a constant level in the process of opening the valve element 14, the motor driving force Fm1 and the return spring force Fs1 become balanced with each other at the opening degree of the valve element 14 at that time, so that the valve element 14 is held at a predetermined opening degree.

The details of the operations of the inlet sealing valve 174 in the present embodiment will be described below. During non-operation of the motor 32 that is not energized (i.e., during stop of the motor 32), the valve opening degree θ is 0, that is, the inlet sealing valve 174 is fully closed (at a mechanical fully-closed opening degree). At that time, as shown in FIG. 11, the full-close stopper part 41a of the main gear 41 contacts with the full-close stopper part 35b of the valve housing 35.

Figure 12:
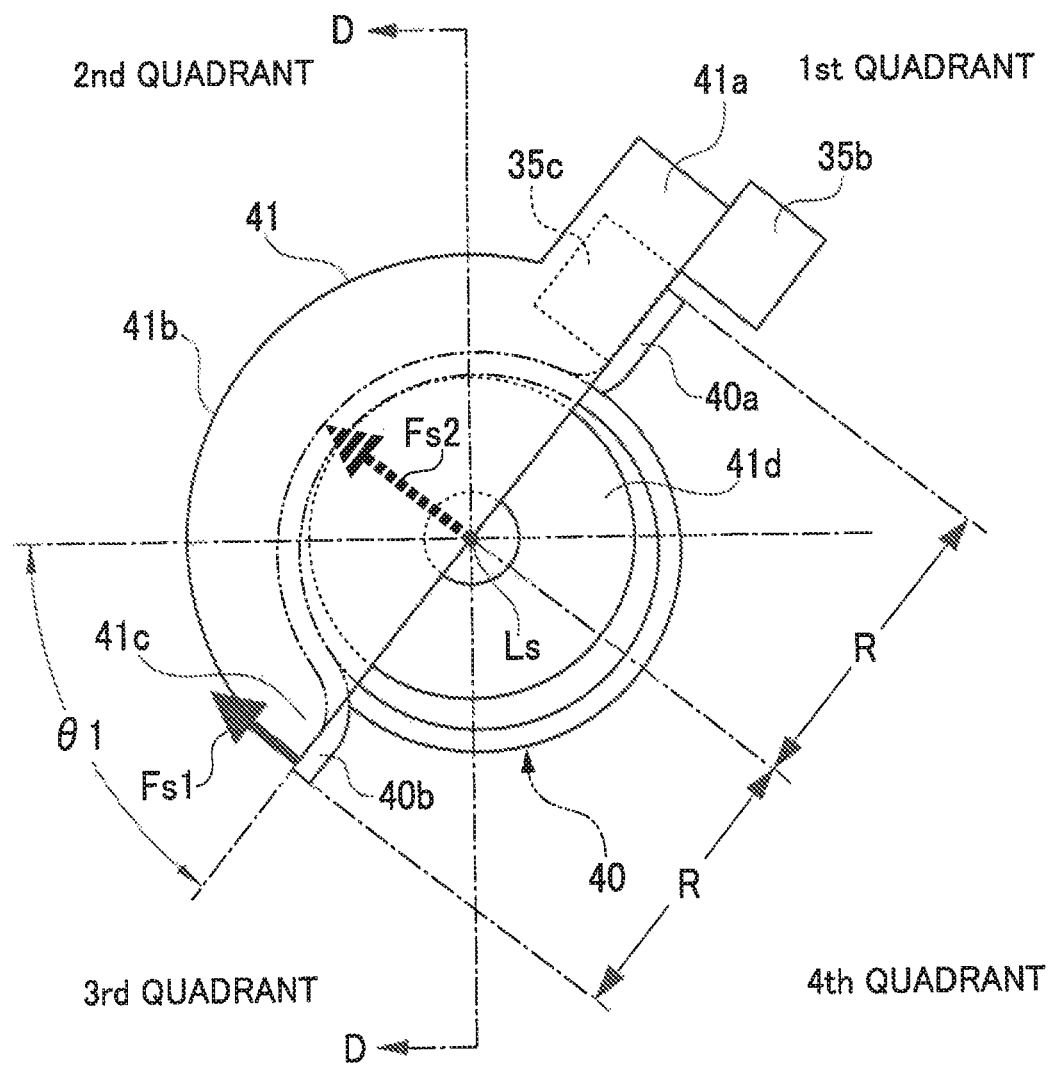
FIG. 12 is a schematic view showing forces acting on the main gear during non-operation of the motor and seen from a main gear side in a central axis direction of a rotary shaft.

In the above state, considering the relationship of forces in terms of a circumferential direction of, or around, the rotary shaft 15, the spring hook part 41c of the main gear 41 receives the return spring force Fs1 from the near-side hook 40b of the return spring 40 as shown in FIG. 12. As shown in FIG. 12, in a rectangular or Cartesian coordinate system consisting of an origin represented by the central axis Ls of the rotary shaft 15, an x-axis represented by a horizontal line, and a y-axis represented by a vertical line, a first quadrant is a part defined by a +x axis and a +y axis, a second quadrant is a part defined by a −x axis and the +y axis, a third quadrant is a part defined by the −x axis and a −y axis, and a fourth quadrant is a part defined by the +x axis and the −y axis. At that time, the far-side hook 40a and the full-close stopper part 41a are placed in a position corresponding to the first quadrant, and the near-side hook 40b and the spring hook part 41c are placed in a position corresponding to the third quadrant.

Herein, based on the principle of leverage, a fulcrum (a pivot point) is set in the full-close stopper part 41a, a point of effort is set in the spring hook part 41c, and a point of load is set in a middle part between the full-close stopper part 41a and the spring hook part 41c. Thus, the return spring force Fs1 applied to the spring hook part 41c causes a force Fs2 to act on the middle part between the full-close stopper part 41a and the spring hook part 41c. This is expressed by: "Force Fs2"=2×"Return spring force Fs1". In FIG. 12, the distance between the full-close stopper part 41a and the spring hook part 41c is set to "2R".

Figure 13:
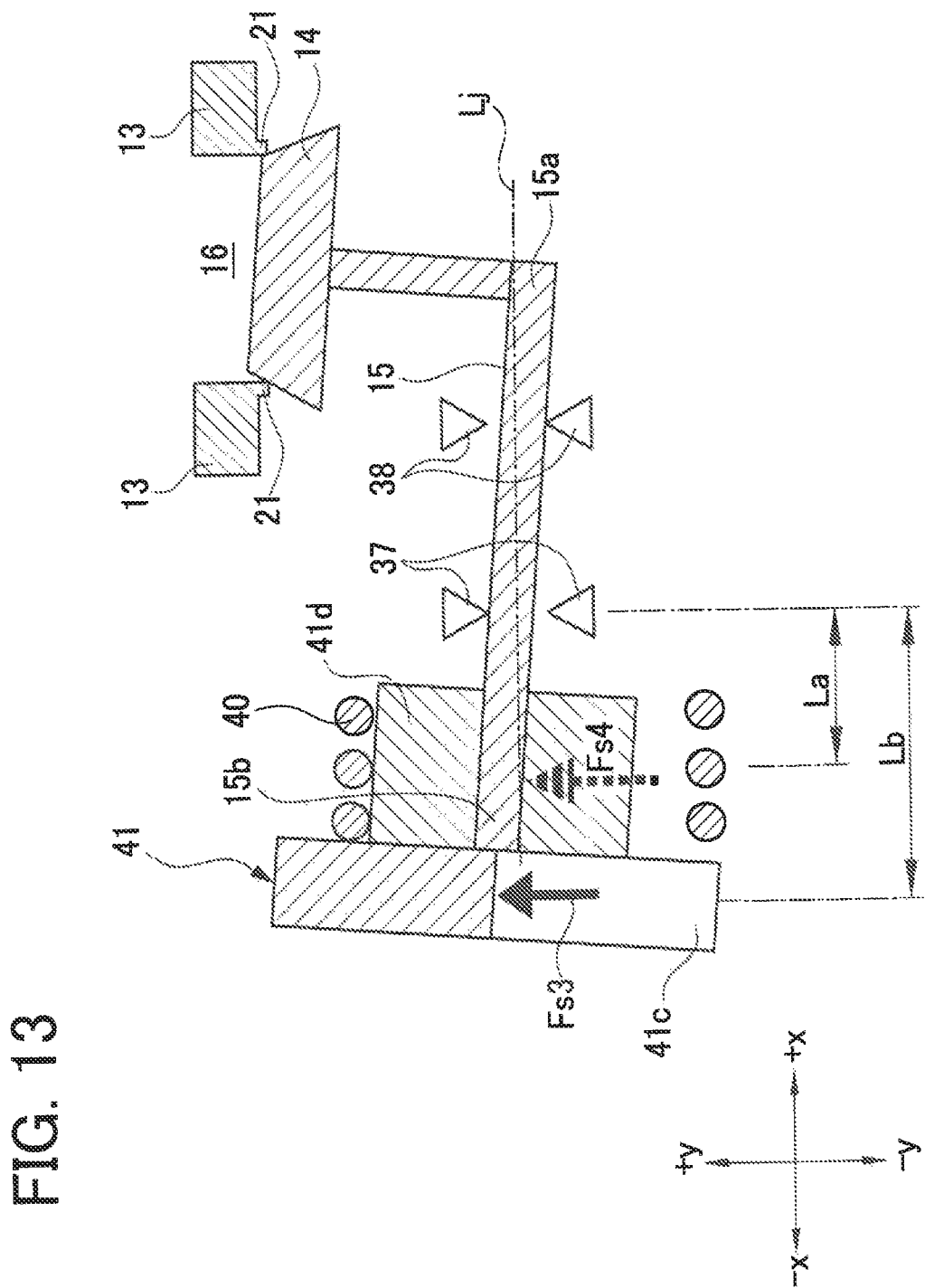
FIG. 13 is a schematic view representing the valve seat, the valve element, the rotary shaft, bearings, and the main gear, showing a cross-sectional view taken along a line D-D in FIG. 12.

At that time, considering the relationship of forces in terms of a cross section of the rotary shaft 15 taken along the central axis Ls, a +y direction component of the force Fs2 is a component force Fs3 as shown in FIG. 13. The +y direction is a direction perpendicular to the central axis Lj direction of the first bearing 37 and the second bearing 38 (the x direction) and is a direction in which the valve seat 13 is placed relative to the valve element 14 (an upward direction in the drawing sheets of FIGS. 12 and 13). This is expressed by: "Component force Fs3"="Force Fs2"×"sin θ1". The angle θ1 is an angle formed between the arrangement direction in which the full-close stopper part 41a and the spring hook part 41c are arranged and the x direction as shown in FIG. 12.

This component force Fs3 causes a force Fs4 (an urging force acting in a direction to separate the valve element 14 from the valve seat 13 (herein, referred to as a "separating-direction urging force")) to act on the spring guide part 41d in the +y direction. This is expressed by: "Force Fs4"="Component force Fs3"×Lb/La. In this way, the force Fs4 is a force that is caused by the return spring force Fs1 and acts in a direction perpendicular to the central axis Lj of the first bearing 37 and the second bearing 38. The distance La is a distance from a position in which the first bearing 37 is placed to a position on which the force Fs4 acts in the x direction. The distance Lb is a distance from the position where the first bearing 37 is placed to a position on which the force Fs3 acts in the x direction.

When the force Fs4 acts in the +y direction in the position of the spring guide part 41d, the rotary shaft 15 integral with the spring guide part 41d is caused to turn and incline clockwise in FIG. 13 about the first bearing 37 serving as the fulcrum. Accordingly, by the principle of leverage, the main gear 41 provided in the proximal end 15b of the rotary shaft 15 is moved in the +y direction, while the valve element 14 provided in the pin 15a of the rotary shaft 15 is moved in the −y direction. Therefore, the valve element 14 is moved in a direction away from the valve seat 13 (a "separating direction"). While the inlet sealing valve 174 is in a valve-closed state during non-operation of the motor 32, the valve element 14 is moved in the direction away from the valve seat 13 by the force Fs4 in the above manner. At that time, the rotary shaft 15 is restrained by the second bearing 38 from further inclining.

At that time, in the present embodiment, the valve element 14 is seated on the rubber seat 21 (the seal member) provided in the valve seat 13 as shown in FIG. 13. Specifically, as shown in FIG. 21, the valve element 14 is in contact with the seal part 21a provided in the rubber seat 21. More concretely, the valve element 14 is in contact with the entire circumference of the seat surface 17 of the seal part 21a. The seal part 21a is configured to be deformable when pressed by the valve element 14. The seal part 21a has such a shape as to increase the surface pressure of a portion in contact with the seal surface 18 of the valve element 14 as the upstream-side pressure of the inlet sealing valve 174 becomes higher than the downstream-side pressure (that is, a front-rear differential pressure becomes larger). For instance, the seal part 21a may be a bead seal, a lip seal, or another type of seals. In this way, the rubber seat 21 closes (seals) between the valve seat 13 and the valve element 14. Thus, the inlet sealing valve 174 enhances the sealing performance with a simple structure.

Accordingly, during deceleration of a vehicle in which the fuel cell system 101 is mounted, when supply of air to the fuel cell stack 111 is to be stopped, the inlet sealing valve 174 is fully closed to increase the pressure in the air supply passage 161 or the stack pressure in the fuel cell stack 111 is decreased, thereby enabling sealing of the air on an inlet side of the fuel cell stack 111. Thus, when the supply of air to the fuel cell stack 111 is stopped, surplus (unnecessary) air is less supplied to the fuel cell stack 111. This can minimize unnecessary power generation in the fuel cell stack 111 during deceleration.

Figure 20:
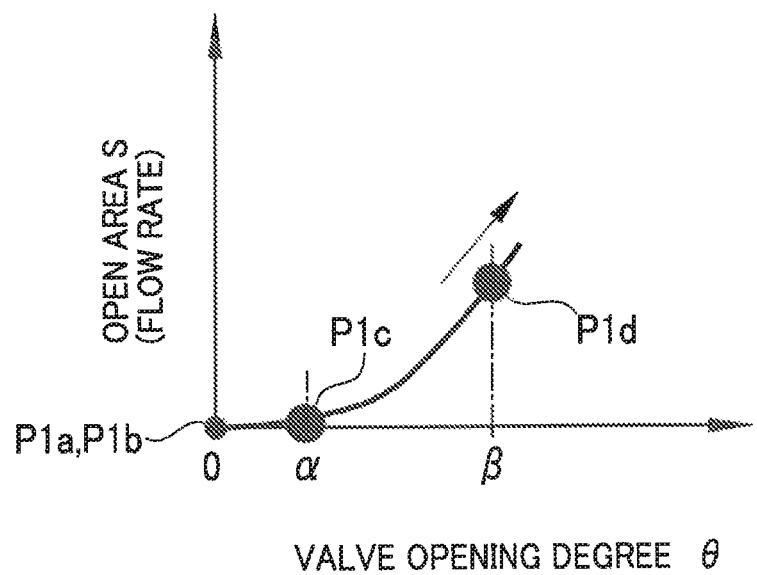
FIG. 20 is a graph showing a relationship between valve opening degree and open area.

At that time, the opening degree θ and the open area S establish the relationship as indicated by a point P1*a* in FIG. 20. Herein, the definition "when the inlet sealing valve 174 is in a fully-closed state (a mechanical fully-closed state)" means that the opening degree θ (the opening degree of the valve element 14) is 0, that is, the rotation angle of the rotary shaft 15 is an angle for full closure (a smallest angle within a rotation range of the rotary shaft 15).

Figure 14:
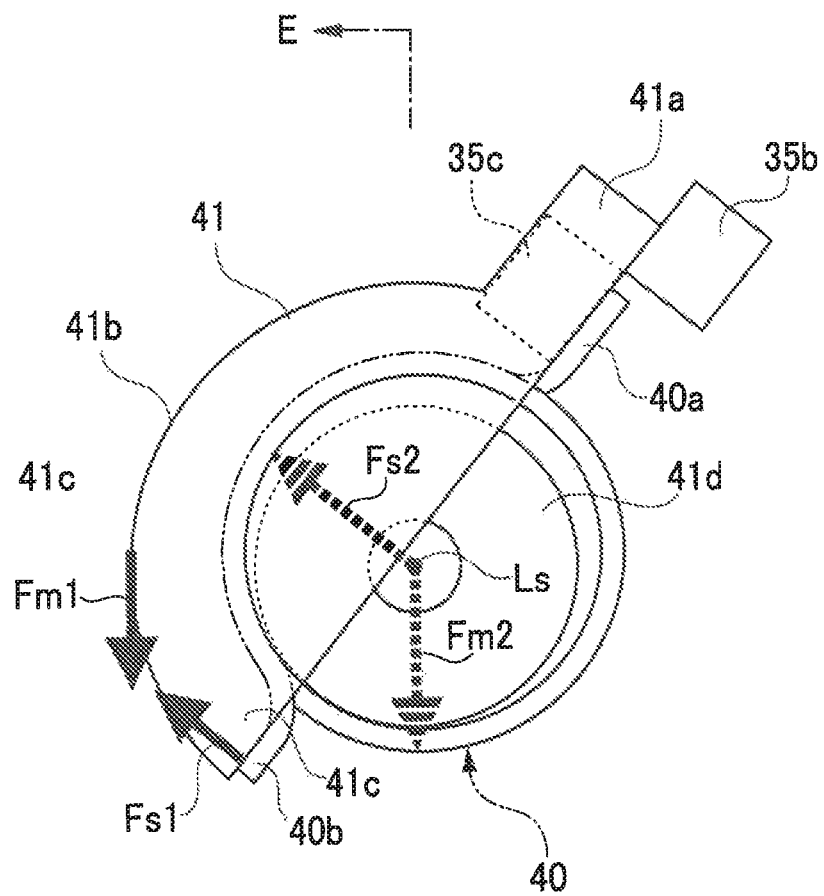
FIG. 14 is a schematic view showing forces acting on the main gear during operation of the motor and seen from the main gear side in the central axis direction of the rotary shaft.

Thereafter, while the motor 32 is driven upon supply of electric power thereto, the small-diameter gear 42*b* (see FIG. 11) of the intermediate gear 42 exerts the motor driving force Fm1 to the gear teeth part 41*b* (see FIG. 11) of the main gear 41 to cause rotation of the main gear 41. When seen from the force relationship in terms of the circumferential direction of the rotary shaft 15 at that time, the motor driving force Fm1 acts in the −y direction as shown in FIG. 14. This −y direction is a perpendicular direction to the central axis Lj direction (the x direction) of the first bearing 37 and the second bearing 38 and a direction in which the valve element 14 is placed relative to the valve seat 13 (a downward direction in the drawing sheets of FIGS. 12 and 13).

The motor driving force Fm1 causes the force Fm2 to act in the −y direction at the position of the central axis Ls of the rotary shaft 15. Further, when seen from the force relationship in terms of the cross section of the rotary shaft 15 taken along the central axis Ls, a force Fm3 (seating-direction urging force) acts in the −y direction at the position of the spring guide part 41*d* as shown in FIG. 15. This is expressed by: "Force Fm3"="Force Fm2"×Lb/La. During operation of the motor 32, in the above manner, the force Fm3 is generated. This force Fm3 is a force that is caused by the motor driving force Fm1 and that acts in a direction perpendicular to the central axis Lj of the first bearing 37 and the second bearing 38. The force Fm3 causes the rotary shaft 15 to turn and incline about the first bearing 37 serving as the fulcrum, thereby urging the valve element 14 in a direction toward the valve seat 13.

Figure 15:
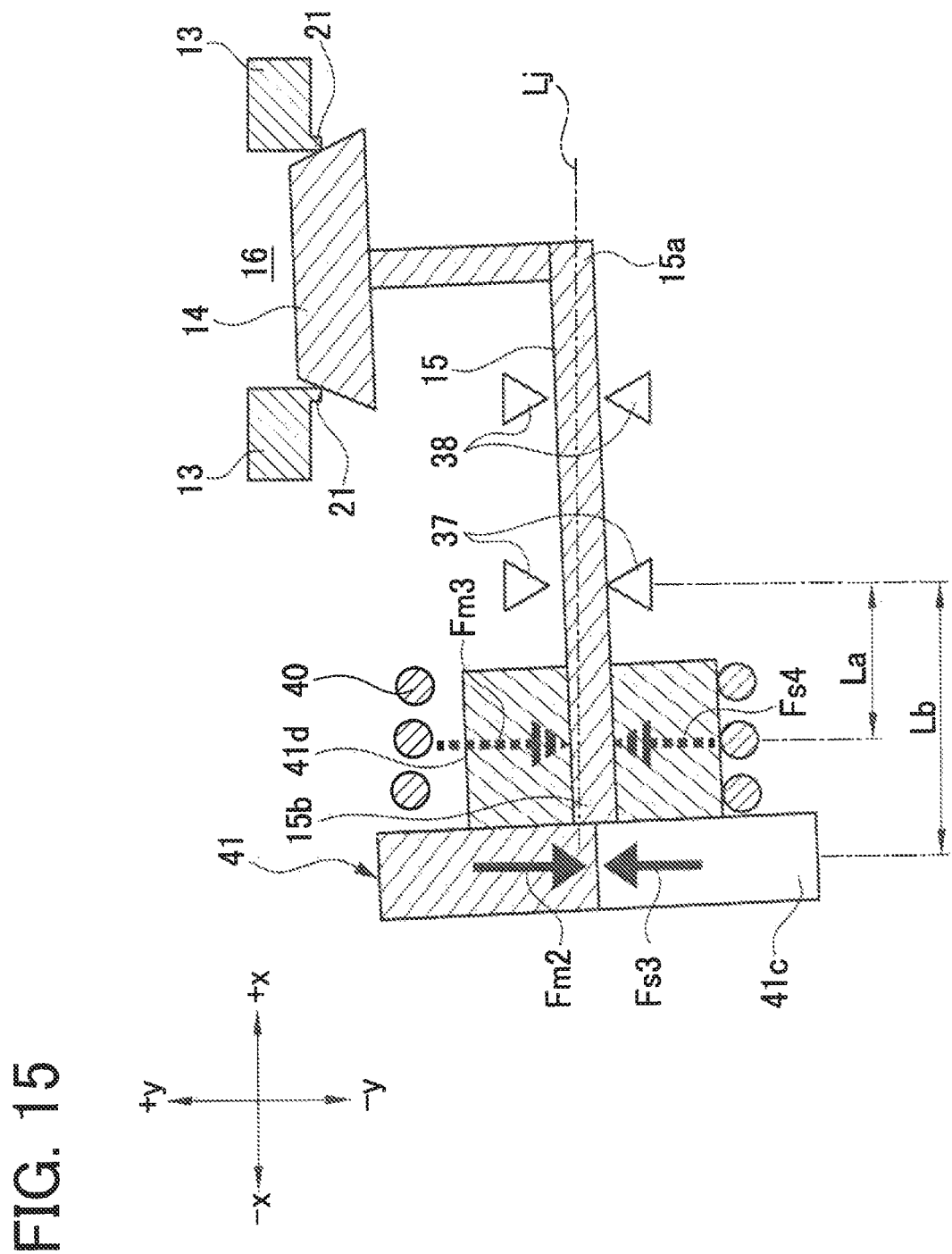
FIG. 15 is a schematic view representing the valve seat, the valve element, the rotary shaft, the bearings, and the main gear, showing a cross-sectional view taken along a line E-E in FIG. 14.

As shown in FIG. 15, when the force Fm3 becomes larger than the force Fs4, the rotary shaft 15 integral with the spring guide part 41*d* of the main gear 41 is caused to turn and incline counterclockwise in FIG. 15 about the first bearing 37 serving as the fulcrum. Accordingly, by the principle of leverage, the main gear 41 is moved in the −y direction, while the valve element 14 moves in the +y direction. Therefore, the valve element 14 is moved in a direction toward the valve seat 13 (a "seating direction") by the force Fm3.

In the present embodiment, at that time, the seal part 21*a* of the rubber seat 21 is pressed and deformed by the valve element 14. However, this seal part 21*a* is deformed within an elastic deformation region and is not plastically deformed. At that time, the relationship between the opening degree θ and the open area S is as indicated by a point P1*b* in FIG. 20.

Figure 16:
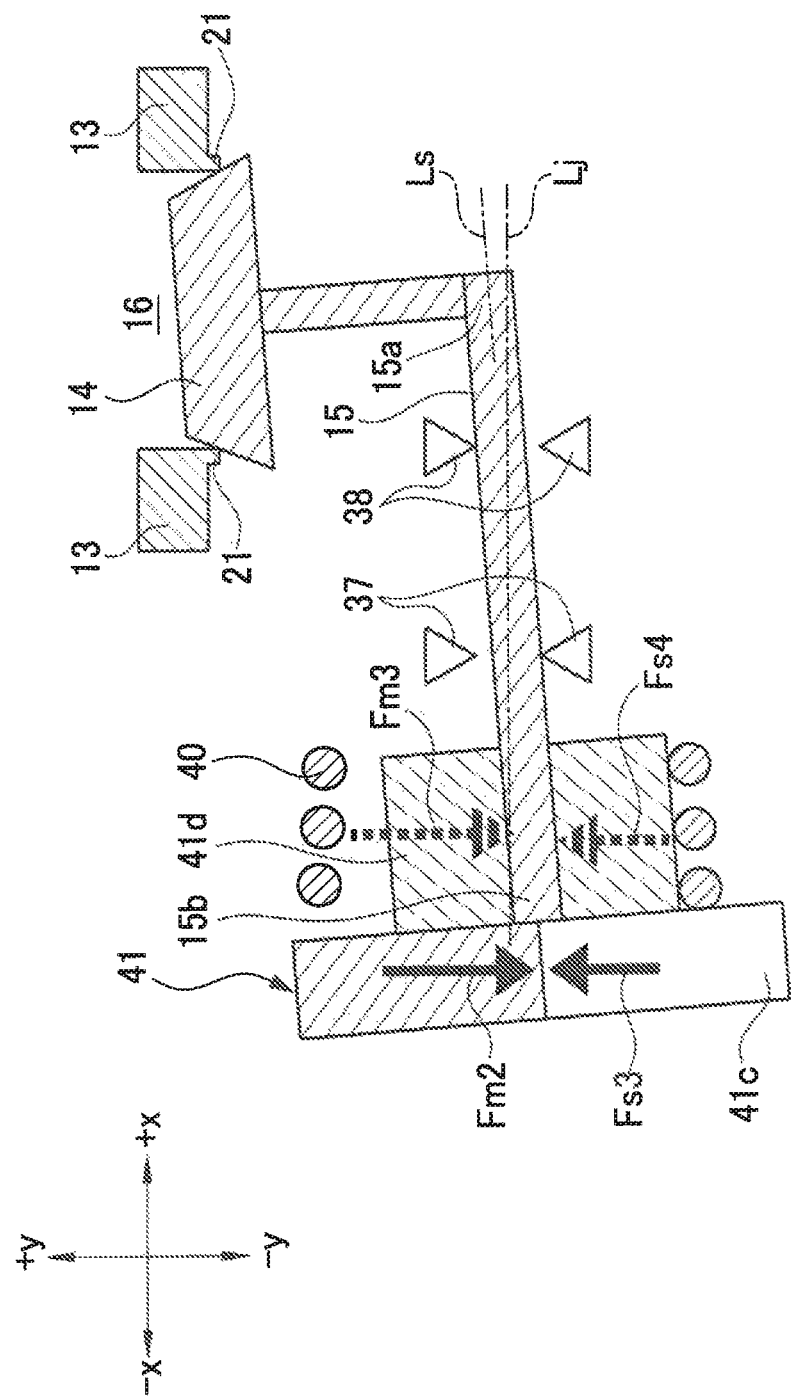
FIG. 16 is a diagram corresponding to FIG. 15 and representing a case where a motor driving force is set larger than that in FIG. 15.
Figure 17:
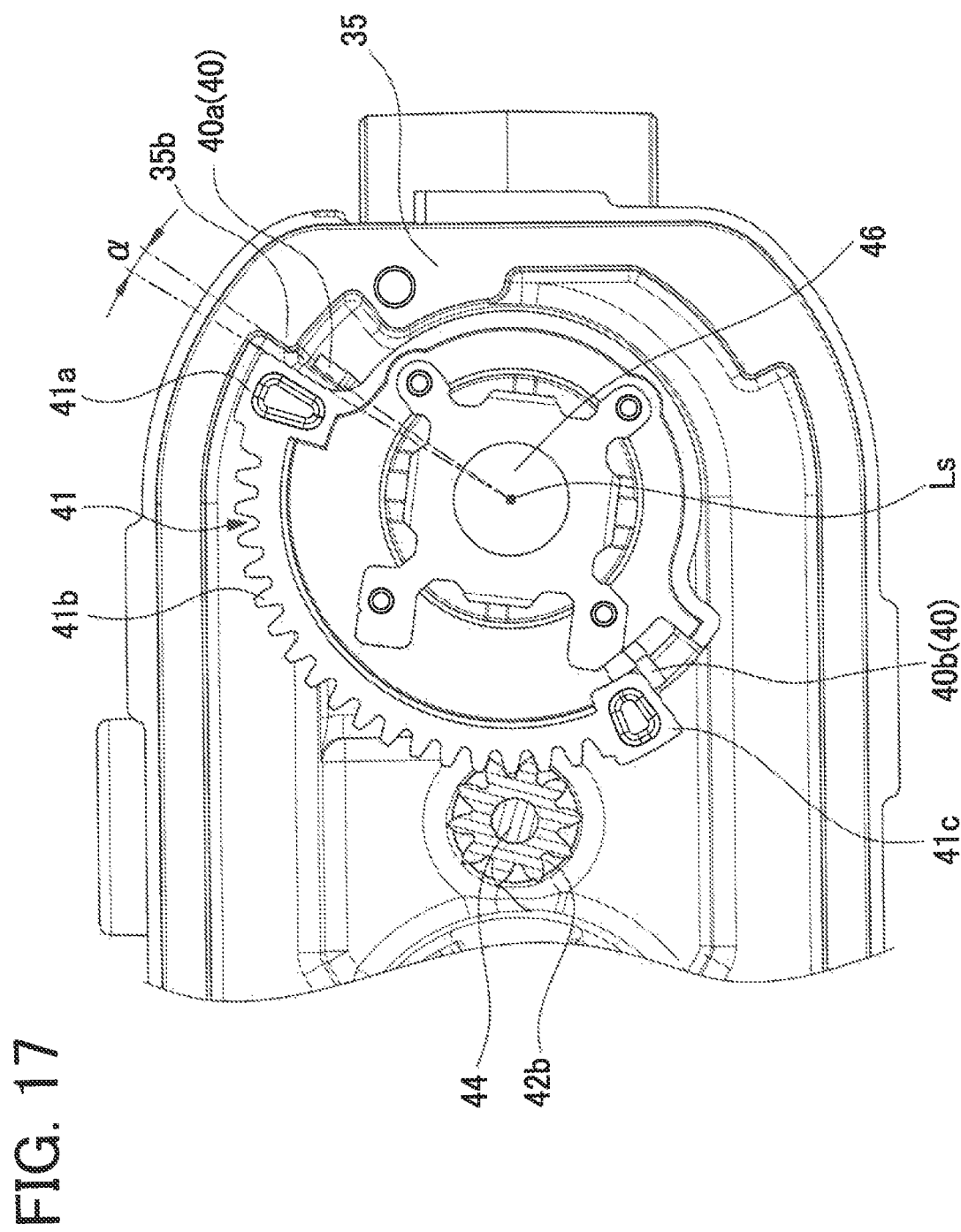
FIG. 17 is an enlarged view (a partially-cutaway view) of the main gear, the return spring, the intermediate gear, and their surrounding parts at a valve opening degree of a during operation of the motor.

Thereafter, when the drive voltage to be applied to the motor 32 rises and thus the motor driving force Fm1 become large, the rotary shaft 15 is caused to further turn and incline counterclockwise in FIG. 16 about the first bearing 37 serving as the fulcrum. Accordingly, the main gear 41 is further moved in the −y direction, while the valve element 14 is further moved in the +y direction. At that time, the rotary shaft 15 is rotated about the central axis Ls, so that the opening degree θ (the rotation angle of the rotary shaft 15) becomes an opening degree "α" (see FIG. 17) corresponding to a position slightly open from the opening degree 0°. In this state, the full-close stopper part 41*a* of the main gear 41 separates from the full-close stopper part 35*b* of the valve housing 35 as shown in FIG. 17. This state is a controlled fully-closed state which will be described later, in which the opening degree α is a controlled fully-closed opening degree. The contents of the controlled fully-closed opening degree will be described later. As shown in FIG. 16, the rotary shaft 15 is stopped by the second bearing 38. At that time, the relationship between the opening degree θ and the open area S is changed as a point P1*c* in FIG. 20. The open area S is nearly zero.

Figure 18:
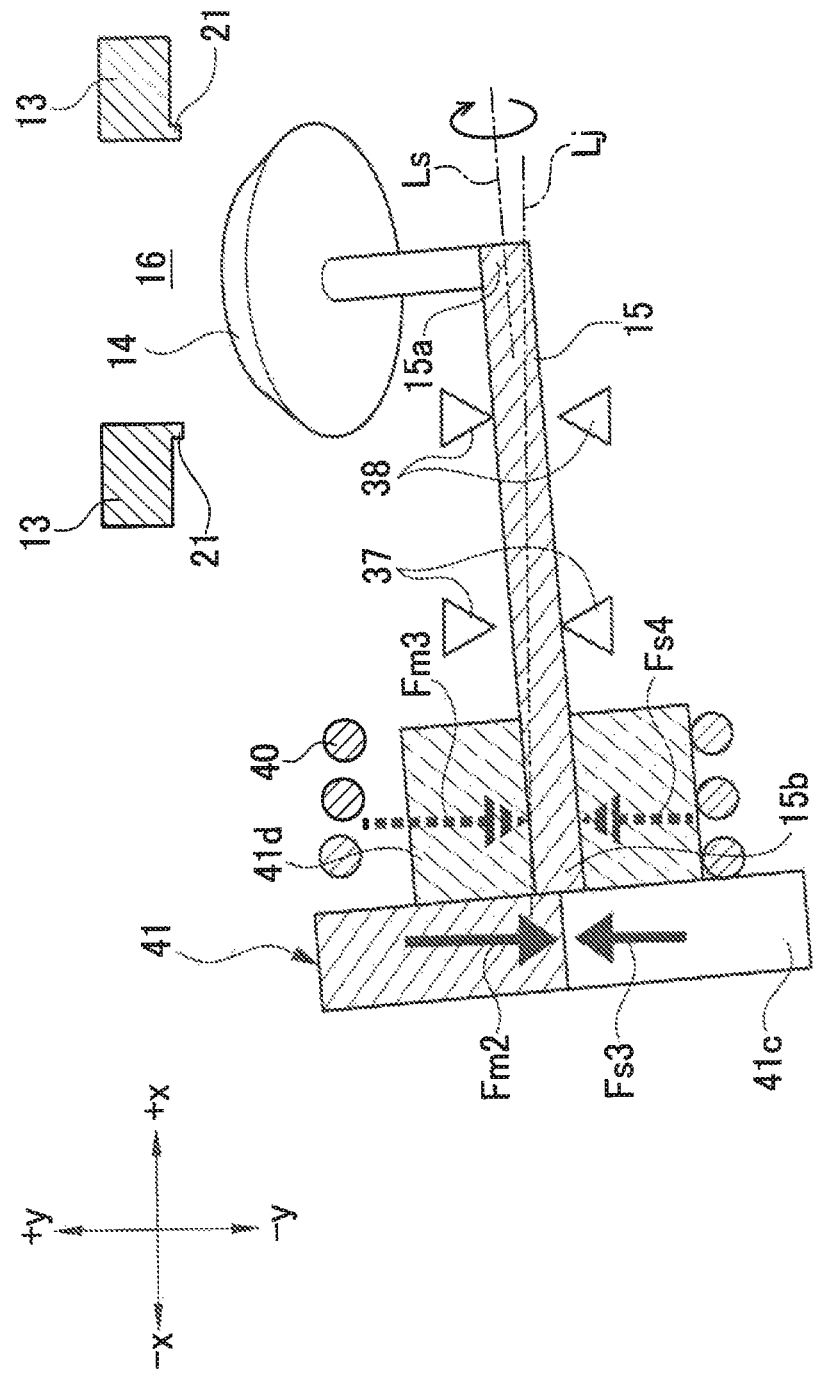
FIG. 18 is a diagram corresponding to FIG. 16 and representing a case where a motor driving force is set larger than that in FIG. 16.
Figure 19:
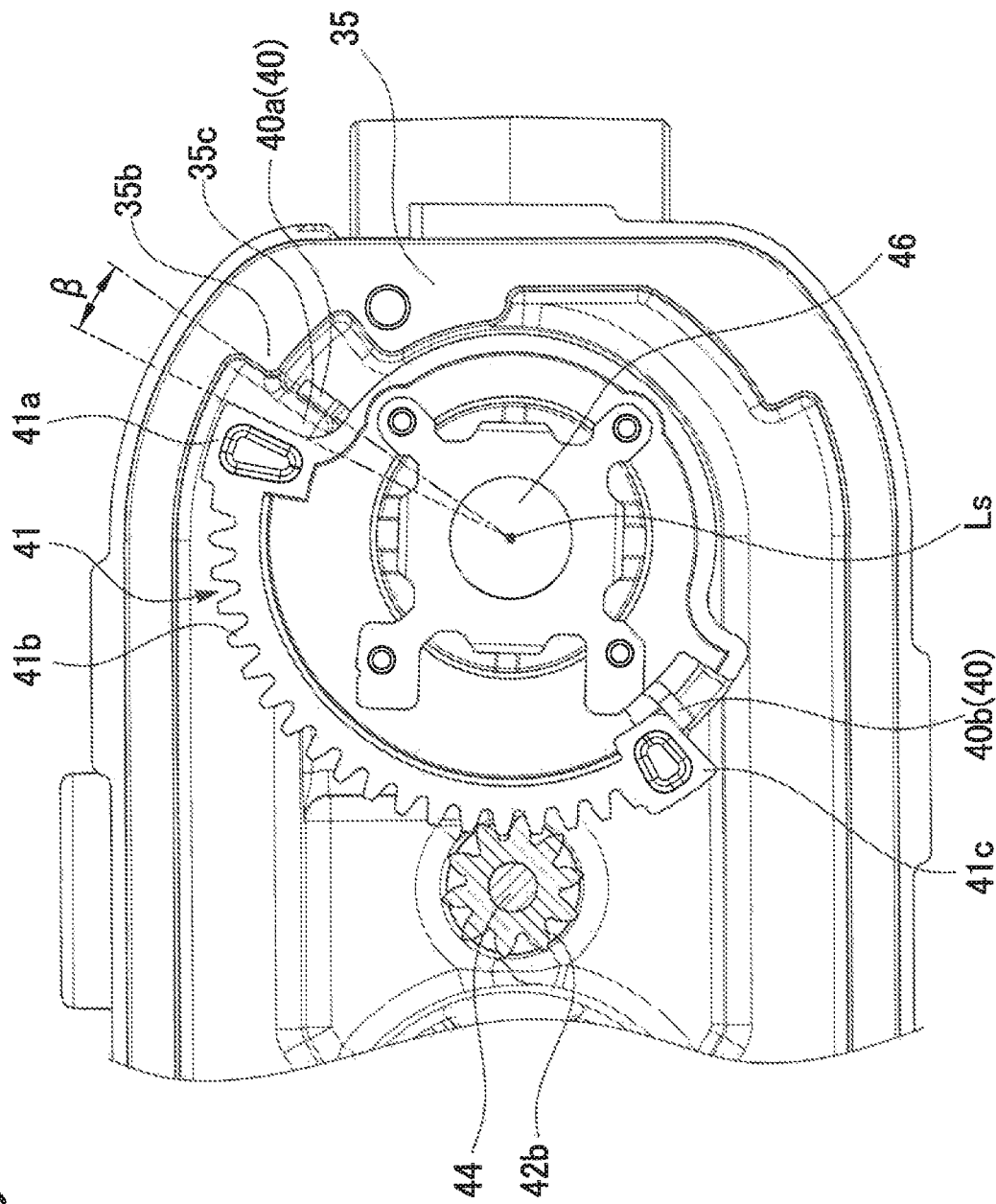
FIG. 19 is an enlarged view (a partially-cutaway view) of the main gear, the return spring, the intermediate gear, and their surrounding parts at a valve opening degree of β during operation of the motor.

Thereafter, as the motor driving force Fm1 becomes larger, the rotary shaft 15 is further rotated about the central axis Ls, thereby causing the valve element 14 to separate from the valve seat 13 as shown in FIG. 18 to increase the open area S for valve-opening. At that time, the valve opening degree θ becomes "β" (see FIG. 19). Further, the relationship between the opening degree θ and the open area S at that time is established as indicated by a point P1*d* in FIG. 20. In the above manner, the valve opening operation of the inlet sealing valve 174 is performed by the motor driving force Fm1.

Figure 22:
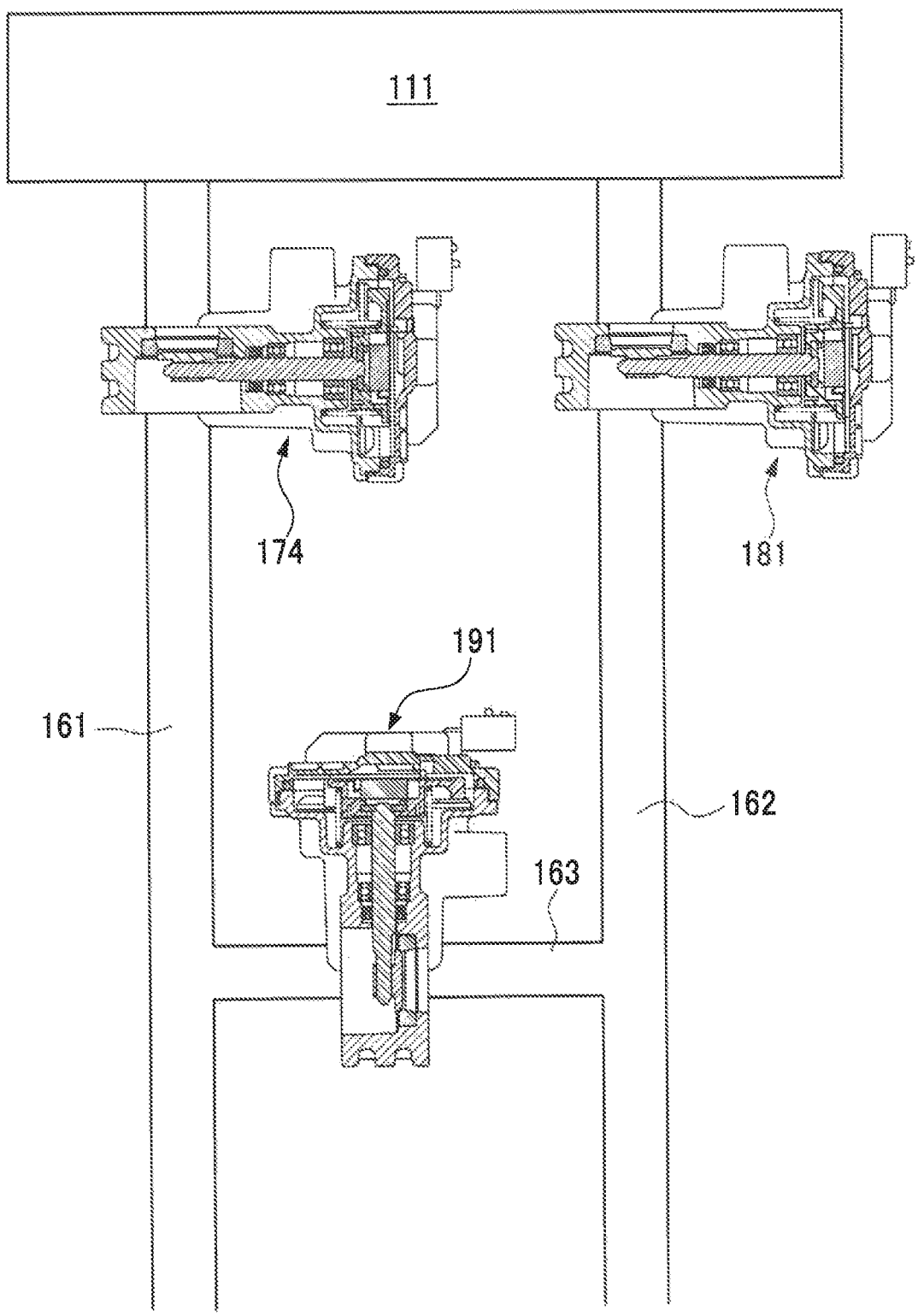
FIG. 22 is a schematic configuration view of an air system.

The outlet integration valve 181 is also configured as above except for the following configuration. Specifically, in the outlet integration valve 181, the seal part of the rubber seat is configured to decrease the surface pressure of a portion in contact with the seal surface of the valve element as the upstream-side pressure of the outlet integration valve 181 becomes larger than the downstream-side pressure. The bypass valve 191 is also configured as above except for the absence of the rubber seat 21. In the air system 113, as described above, the eccentric valves basically identical in structure are used for the inlet sealing valve 174, the outlet integration valve 181, and the bypass valve 191 as shown in FIG. 22 to allow commonality of valves in the air system 113, except that the inlet sealing valve 174 and the outlet integration valve 181 are different in structure of the rubber seat and the bypass valve 191 includes no rubber seat. Further, since the inlet sealing valve 174, the outlet integration valve 181, and the bypass valve 191 are common in structure except for the rubber seats, the opening and closing control (operation) itself is common and thus those valves can be controlled in cooperation. From the above-mentioned configuration, the fuel cell system 101 can be reduced in cost and the controller 201 can be simplified in control of opening and closing the valves.

Herein, each valve in the air system 113 needs to satisfy the following performance requirements. Specifically, the inlet sealing valve 174 is required to meet a sealing request and a low-pressure loss request. The outlet integration valve 181 is required to meet a sealing request and a flow control resolution request. The bypass valve 191 is required to meet a depressure request. Therefore, the inlet sealing valve 174 having the low-pressure loss request needs a valve hole diameter (a valve diameter) larger than a predetermined diameter. In contrast, different from the inlet sealing valve 174, the outlet integration valve 181 and the bypass valve 191 do not have the low-pressure loss request. It is ascertained that if the valve hole diameter of the outlet integration valve 181 is equal to the valve hole diameter of the inlet sealing valve 174, the flow control resolution of the outlet integration valve 181 is deteriorated and the frequency of the flow control with slight opening degree is increased, and thus the seal part 21a of the rubber seat 21 is apt to be worn away.

Therefore, the valve hole diameter of each of the outlet integration valve 181 and the bypass valve 191 is preferably set smaller than the valve hole diameter of the inlet sealing valve 174. This can avoid deterioration in flow control resolution in the outlet integration valve 181 and wear of the seal part 21a and further promote cost reduction for the outlet integration valve 181 and the bypass valve 191. Thus, the fuel cell system 101 can be further reduced in cost.

Moreover, the outlet integration valve 181 and the bypass valve 191 can be designed with the same valve hole diameter to standardize parts or components excepting the rubber seat 21. Accordingly, the cost reduction for the outlet integration valve 181 and the bypass valve 191 can be further promoted, leading to further reduction in cost of the fuel cell system 101. Further, the bypass valve 191 and the outlet integration valve 181 can be designed with the same structure including the rubber seat 21 to standardize valves. This makes it less likely to cause assembling errors in manufacturing the fuel cell system 101 while achieving reduction in production cost by volume production. The workability can be thus enhanced.

Figure 23:
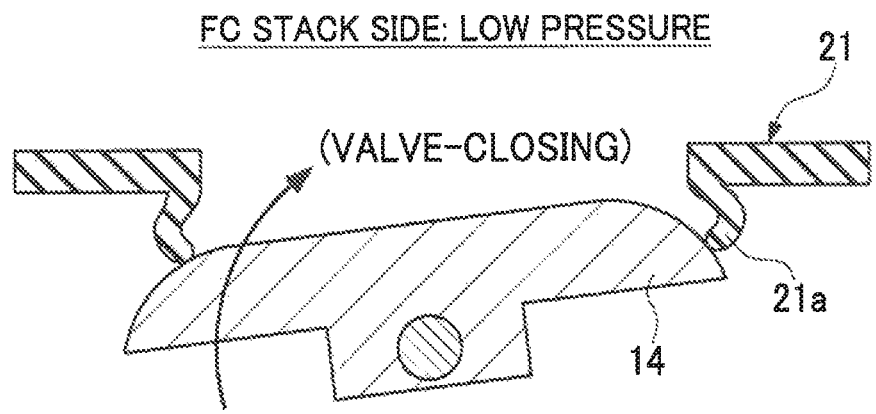
FIG. 23 is a view showing a state of a rubber seat with a seal part bent back during valve-closing.
Figure 24:
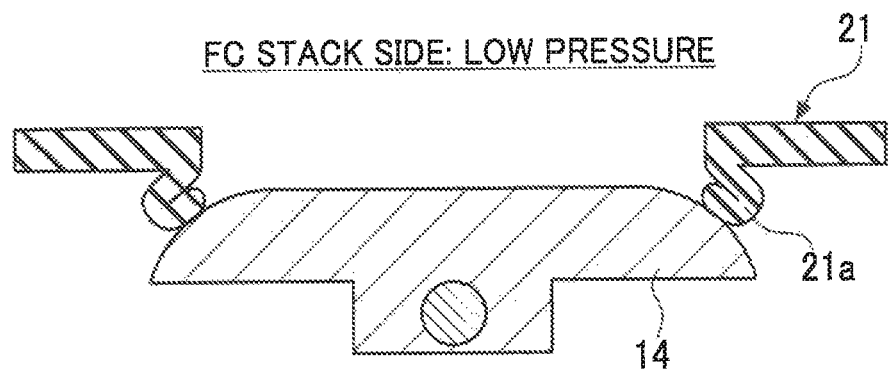
FIG. 24 is a view showing a closed state of the rubber seat with the seal part remaining bent back.

Herein, the seal part 21a of the rubber seat 21 in the inlet sealing valve 174 has such a shape as to increase the surface pressure of a portion in contact with the seal surface 18 of the valve element 14 when the pressure in the air supply passage 161 rises or when the stack pressure in the fuel cell stack 111 decreases. Accordingly, when supply of air to the fuel cell stack 111 is stopped during vehicle deceleration, the pressure in the air supply passage 161 rises or the stack pressure in the fuel cell stack 111 descends, increasing a front-rear differential pressure of the inlet sealing valve 174, the seal part 21a bent or curled back (so as to be entangled inward) may contact with the valve element 14 during valve-closing of the inlet sealing valve 174 as shown in FIG. 23. Then, as shown in FIG. 24, when the valve element 14 remaining bent back is placed in a fully-closed position, as shown in FIG. 24, the seal part 21a deformed in an unusual shape contacts with the valve element 14. This causes not only leakage due to poor sealing performance but also damage to the seal part 21a and abnormal wear of the seal part 21a. Therefore, the inlet sealing valve 174 cannot seal air and cause supply of surplus (unnecessary) air to the fuel cell stack 111.

In the fuel cell system 101, therefore, when the supply of air to the fuel cell stack 111 is to be stopped during deceleration, the following control (deceleration (regenerative) control) is executed to avoid the aforementioned abnormal contact of the seal part 21a with the valve element 14.

Figure 25:
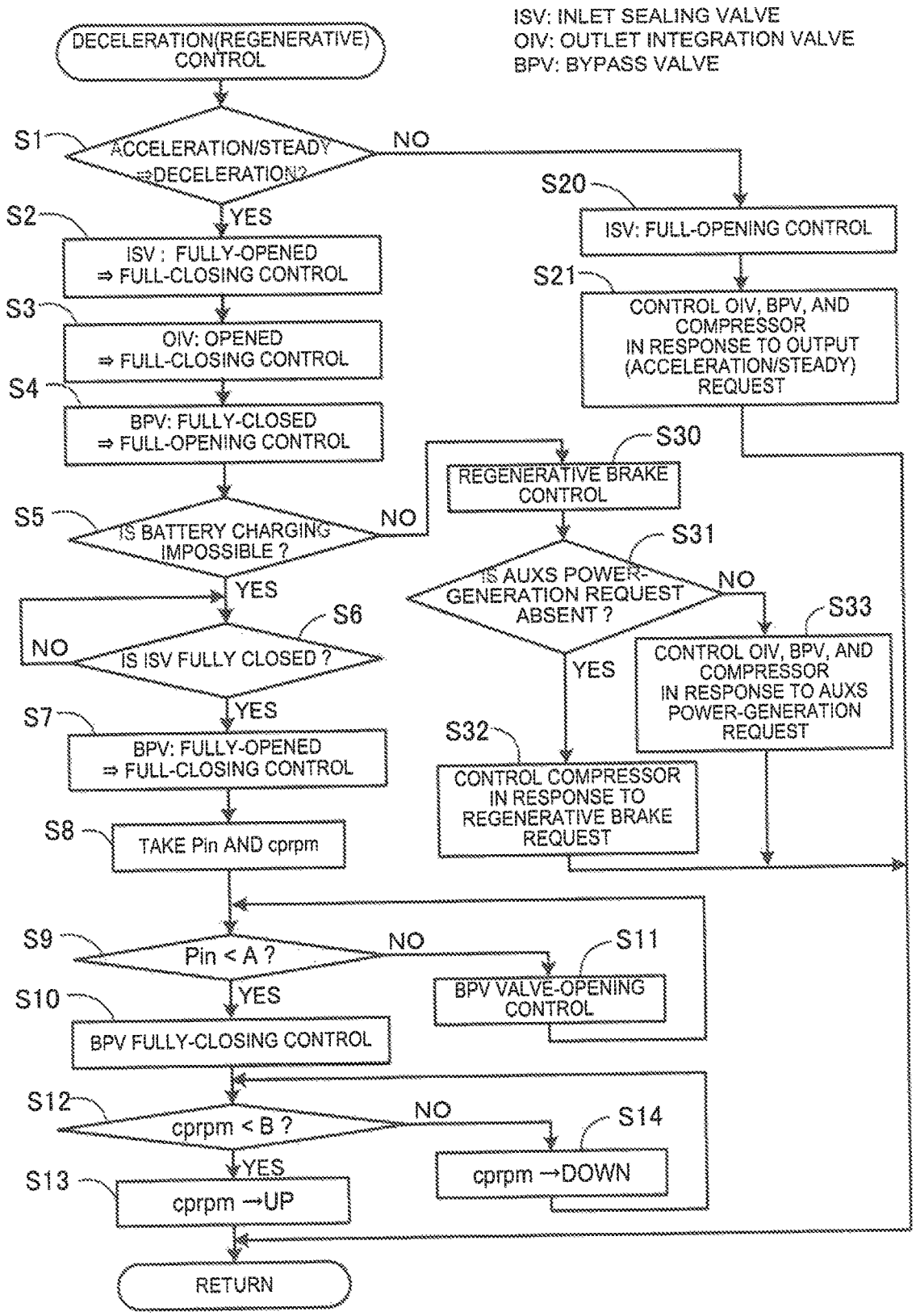
FIG. 25 is a flowchart showing control contents during deceleration.
Figure 26:
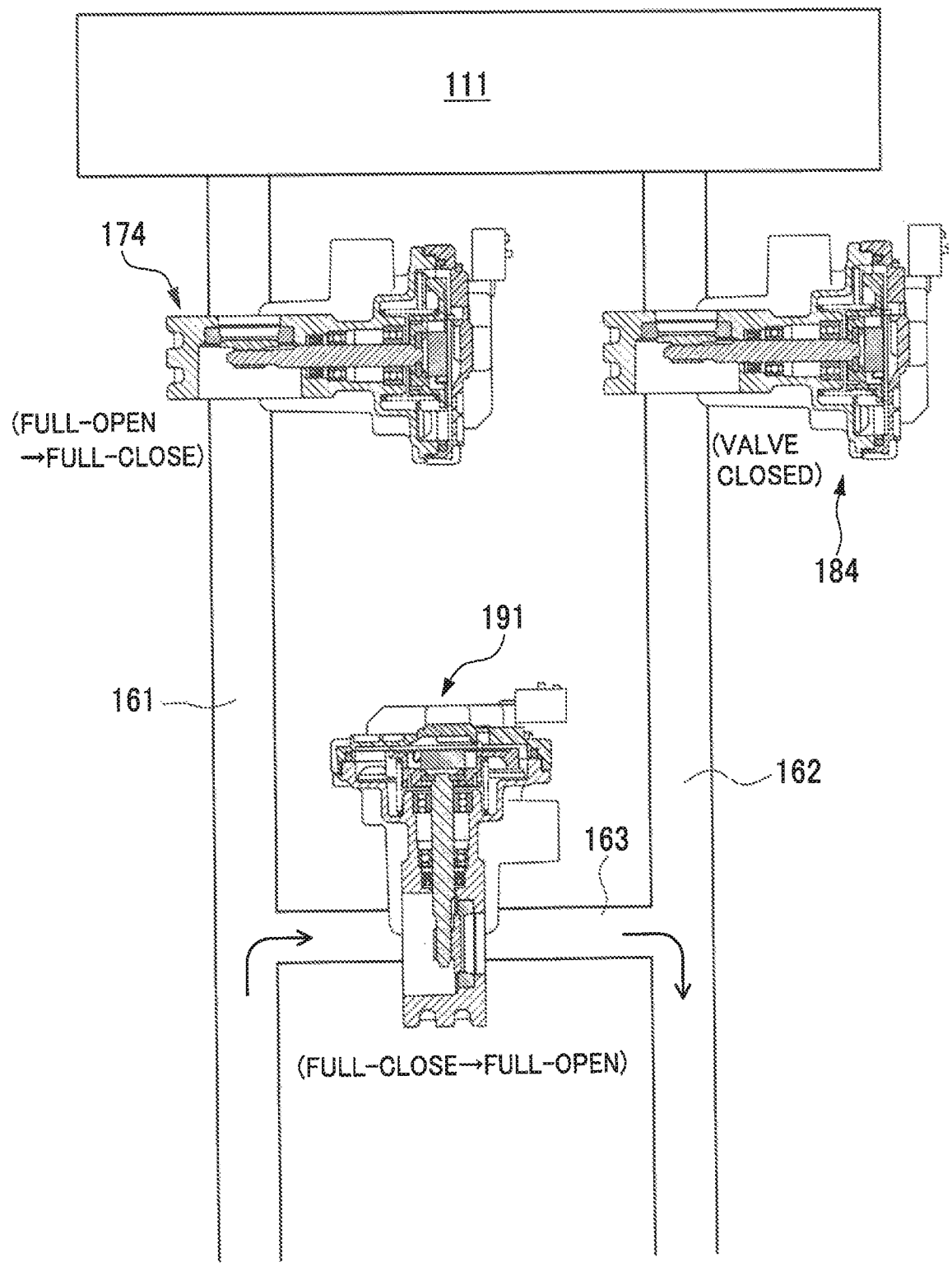
FIG. 26 is a view showing air flow directions in an air system at an initial stage of deceleration.

To be specific, the controller 201 performs the control based on a control flowchart shown in FIG. 25. Firstly, when a vehicle changes from an acceleration/steady state to a deceleration state (step S1: YES), full-closing control is performed to fully close (mechanically fully close) the inlet sealing valve 174 from a fully-opened state (step S2). Further, full-closing control is executed to bring the outlet integration valve 181 from an opening degree corresponding to an output (acceleration/steady) request before deceleration to a fully-closed state (step S3). In addition, full-opening control is also performed to fully open the bypass valve 191 from a fully-closed state (step S4). At an initial stage of deceleration, accordingly, the air supplied from the compressor 172 is allowed to flow from the air supply passage 161 to the air exhaust passage 162 via the bypass passage 163 as shown in FIG. 26. Thus, the pressure in the air supply passage 161 does not rise.

In contrast, when the acceleration/steady state is maintained (step S1: NO), the inlet sealing valve 174 is kept in the fully-opened state (step S20). In response to the output (acceleration/steady) request at that time, the opening degree of the outlet integration valve 181 and the opening degree of the bypass valve 191 are individually controlled and also the number of revolutions ("revolution number") of the compressor 172 is controlled (step S21).

Next, it is determined whether or not charging of a battery mounted in the vehicle during deceleration is impossible (step S5). When charging of the battery is impossible (step S5: YES), it is necessary to discharge electric power generated in the fuel cell stack 111. In the present embodiment, therefore, the following compressor discharge control is executed to consume the electric power excessively generated in the fuel cell stack 111 during deceleration. It is firstly determined whether or not the inlet sealing valve 174 having undergone the full-closing control in step S3 has been fully closed (Opening degree=0) (step S6). After the inlet sealing valve 174 is confirmed to be fully closed (step S6: YES), the full-closing control is performed to bring the bypass valve 191 held in the fully-opened state to a fully-closed state (step S7).

Thus, the inlet sealing valve 174 is fully closed before the pressure in the air supply passage 161 rises, so that the seal part 21a normally contacts with, i.e. seats on, the seal surface 18 of the valve element 14. Thereafter, the bypass valve 191 is fully closed and thus the pressure in the air supply passage 161 rises. This can reliably prevent the seal part 21a from bending or curling back at the time of valve-closing of the inlet sealing valve 174. During valve-closing of the inlet sealing valve 174, therefore, the seal part 21a can normally contact with, i.e. seat on, the seal surface 18 of the valve element 14 without bending back in contacting with, i.e. seating on, the seal surface 18. Accordingly, when supply of air to the fuel cell stack 111 is stopped during deceleration, the inlet sealing valve 174 can reliably seal the air and thus reduce supply of surplus (unnecessary) air to the fuel cell stack 111. This results in reduced time of performing the compressor discharge control described later.

When the bypass valve 191 is fully closed, the controller 201 takes or reads the compressor pressure (Pin) and the compressor revolution number (cprpm) of the compressor 172 (step S8). It is then determined whether or not the compressor pressure (Pin) is smaller than a discharge target pressure A (Pin<A) (step S9). When the compressor pressure (Pin) is smaller than the discharge target pressure A (step S9: YES), the bypass valve 191 is subjected to valve-closing control to increase the compressor pressure (Pin) (step S10). In contrast, when the compressor pressure (Pin) is equal to or larger than the discharge target pressure A (step S9: NO), the bypass valve 191 is subjected to valve-opening control to decrease the compressor pressure (Pin) (step S11).

Successively, a determination is made whether or not the compressor revolution number (cprpm) is smaller than a discharge target revolution number B (cprpm<B) (step S12). When the compressor revolution number (cprpm) is smaller than the discharge target revolution number B (step S12: YES), the revolution number of the compressor 172 is increased (step S13). In contrast, when the compressor revolution number (cprpm) is equal to or larger than the discharge target revolution number B (step S12: NO), the revolution number of the compressor 172 is decreased (step S14).

In the above manner, the compressor pressure and the compressor revolution number can be adjusted respectively to the vicinity of the discharge target pressure A and the revolution number revolution number B, so that the compressor 172 can efficiently discharge the electric power overgenerated in the fuel cell stack 111. The discharge target pressure A and the discharge target revolution number B are the values experimentally determined in advance in order to efficiently consume, or discharge, electric power overgenerated in the fuel cell stack 111 in consideration of operating sounds of the compressor 172.

When charging of the battery is not impossible (step S5: NO), on the other hand, the regenerative brake control is performed to charge electric power generated in the fuel cell stack 111 to the battery (step S30). A determination is made whether or not an auxiliaries (AUXS) power-generation request is absent (step S31). When this request is absent (step S31: YES), the revolution number of the compressor 172 is controlled in response to a regenerative brake request (S32). Accordingly, the compressor 172 maintains the constant number of revolutions. Even when an acceleration request is thereafter given, power generation in the fuel cell stack 111 can be performed according to required output. Since the bypass valve 191 is opened, even if the compressor 172 maintains the constant revolution number, the compressor 172 is under a small load (power consumption).

When the AUXS power-generation request is not absent, i.e. is present (step S31: NO), the opening degree of the outlet integration valve 181 and the opening degree of the bypass valve 191 are individually controlled according to the AUXS power-generation request, and also the revolution number of the compressor 172 is controlled (step S33).

According to the fuel cell system 101 in the present embodiment explained in detail above, the inlet sealing valve 174 is configured as the eccentric valve including the rubber seat 21 provided with the seal part 21*a* having such a shape as to increase the surface pressure of a portion in contact with the seal surface 18 of the valve element 14 as the upstream-side pressure becomes larger than the downstream-side pressure. Accordingly, when supply of air to the fuel cell stack 111 is to be stopped, the inlet sealing valve 174 is fully closed, thereby enabling scaling the air on an inlet side of the fuel cell stack 111. Therefore, surplus (unnecessary) air is less supplied to the fuel cell stack 111 when the supply of air to the fuel cell stack 111 is stopped. This can minimize unnecessary power generation in the fuel cell stack 111 during deceleration.

In stopping supply of air to the fuel cell stack 111 during deceleration, the controller 201 causes the inlet sealing valve 174 to close and the bypass valve 191 to open and, after the inlet sealing valve 174 is fully closed, the controller 201 causes the bypass valve 191 to close.

Therefore, the pressure in the air supply passage 161 rises while the seal part 21*a* of the rubber seat 21 is in a normal contact position, i.e. is properly seated on, the seal surface 18 of the valve element 14. This can reliably prevent the seal part 21*a* from bending or curling back inwardly at the time of valve-closing of the inlet sealing valve 174. It is therefore possible to reliably seal the air when supply of the air to the fuel cell stack 111 is stopped.

In the present embodiment, when the inlet sealing valve 174 is to be fully closed during system stop or deceleration, the seal surface 18 of the valve element 14 slides on the seal part 21*a* of the rubber seat 21 until the valve element 14 comes to seated on the valve seat 13. As wear of the seal part 21*a* due to sliding contact of the seal surface 18 develops, the inlet sealing valve 174 cannot achieve high sealing performance. During system stop, if the sealing performance of the inlet scaling valve 174 cannot be enhanced, the seal-off degree of the fuel cell stack 111 during system stop may be decreased, causing a reaction in the fuel cell stack 111 and deterioration due to oxidation in the fuel cell stack 111.

In the fuel cell system 101, therefore, when supply of air to the fuel cell stack 111 is stopped during deceleration or system stop, the following control on the basis of the aforementioned control is preferably executed to suppress wear of the seal part 21*a* to enhance the sealing performance of the inlet sealing valve 174 during system stop in order to prevent degradation of the fuel cell stack 111.

Figure 27:
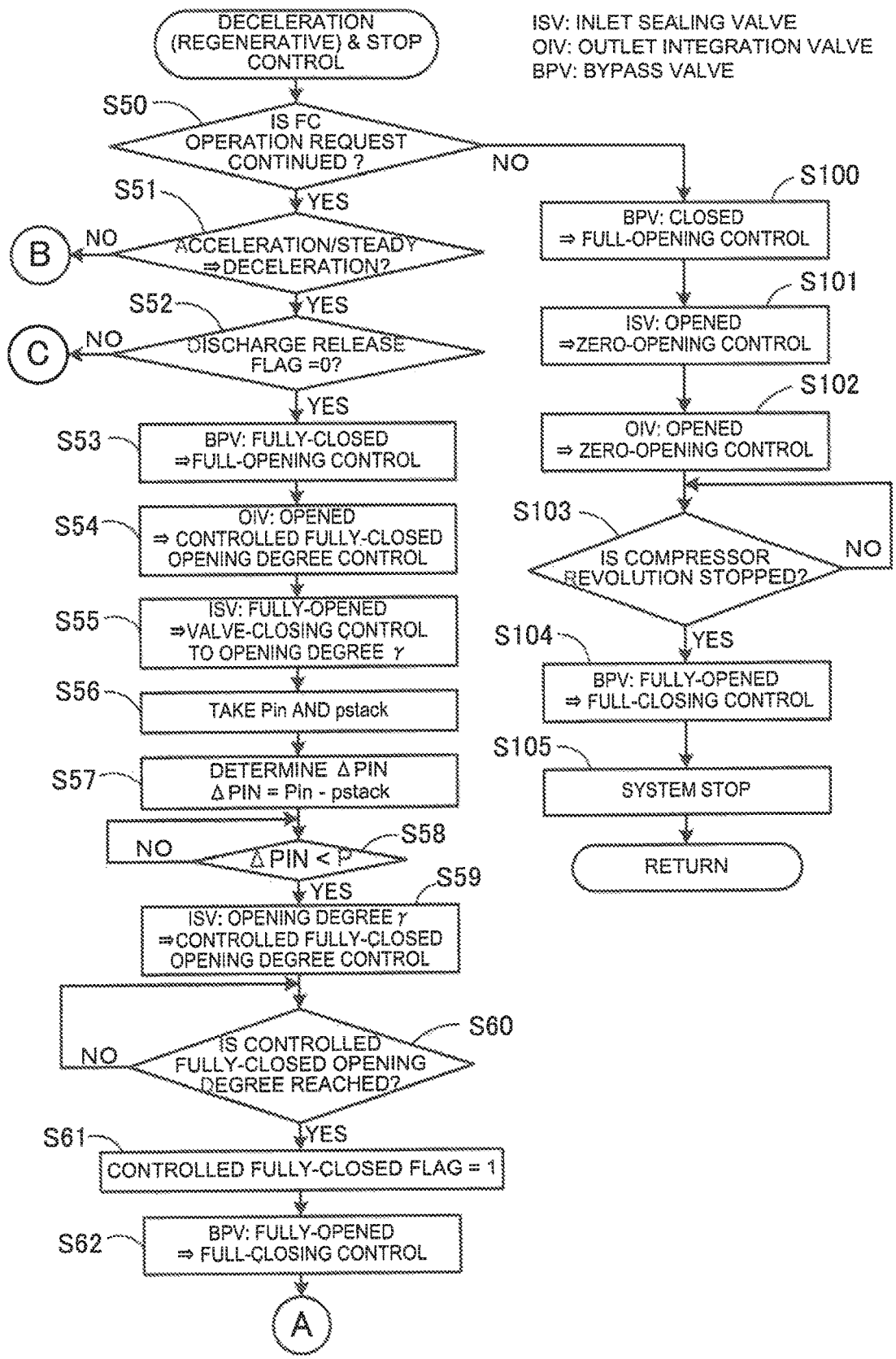
FIG. 27 is a flowchart showing control contents during deceleration and system stop.
Figure 28:
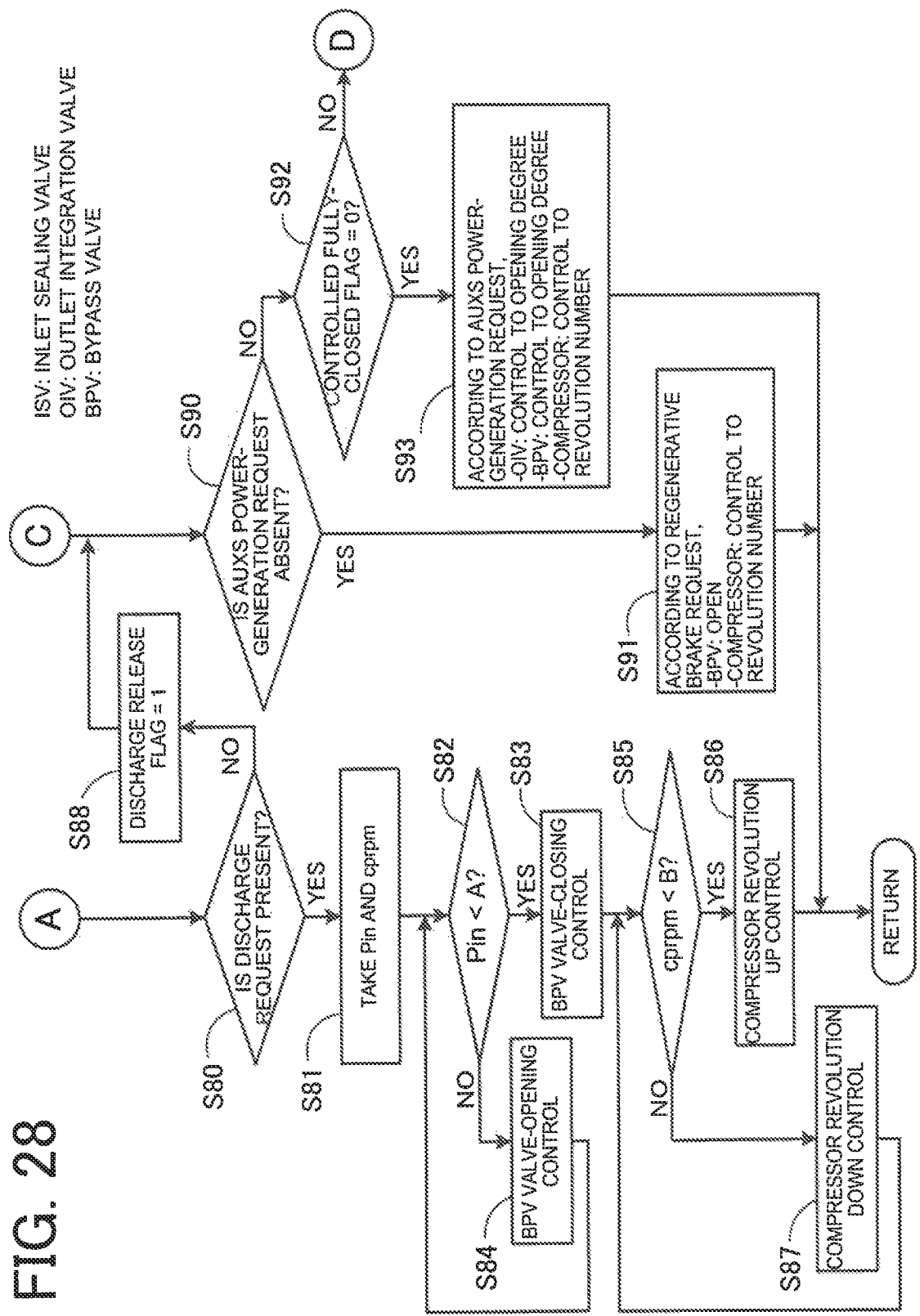
FIG. 28 is a flowchart showing contents of discharge control and regenerative control during deceleration.
Figure 29:
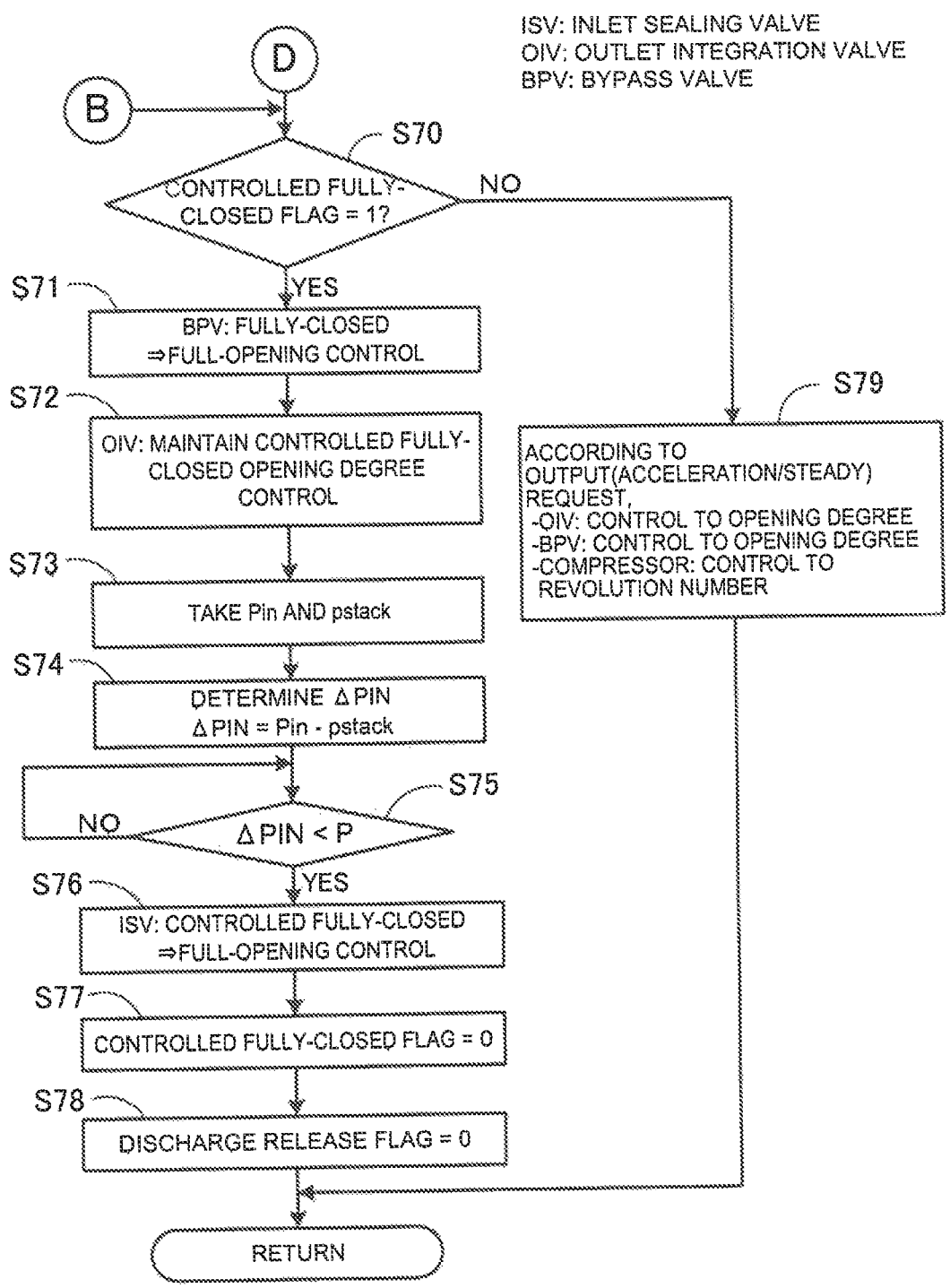
FIG. 29 is a flowchart showing control contents at the completion of deceleration and during acceleration/steady state operation.

To be concrete, the controller 201 has only to execute the control based on control flowcharts in FIGS. 27 to 29. The controller 201 firstly determines whether or not an operation request to the fuel cell stack 111 is continued (step S50). When this operation request to the fuel cell stack 111 is continued (step S50: YES), the controller 201 then determines whether or not the vehicle changes from the acceleration/steady state to the deceleration state (step S51).

When the vehicle changes from the acceleration/steady state to the deceleration state (step S51: YES), the controller 201 determines whether or not a discharge release flag is 0 (step S52). This discharge release flag being "0" indicates the presence of the request, while the discharge release flag being "1" indicates the absence of the request. The discharge request is generated when the electric power generated in the fuel cell stack 111 during deceleration cannot be charged to the battery.

When the discharge release flag is 0 (step S52: YES), the controller 201 performs the full-opening control to fully open the bypass valve 191 from the fully-closed state (step S53). Accordingly, the compressor pressure of the compressor 172 no longer acts on the inlet sealing valve 174, resulting in a decrease in the front-rear differential pressure of the inlet sealing valve 174. When the discharge release flag is 1 (step S52: NO), the controller 201 carries out the processings in steps S90 to S93 mentioned later.

Further, controlled fully-closed opening-degree control is executed to close the outlet integration valve 181 from the opening degree meeting the output (acceleration/steady) request before deceleration to a controlled fully-closed opening degree α (step S54). It is to be noted that the processing in this step S54 may be omitted. However, when the processing in step S54 is performed in addition to the processing step S53, the front-rear differential pressure of the inlet sealing valve 174 can be reduced even if either valve, that is, the bypass valve or the outlet integration valve, is broken down (bypass valve closing failure or outlet integration valve opening failure).

Furthermore, the controller 201 performs the valve-closing control to close the inlet sealing valve 174 from the fully-opened state to a predetermined opening degree 7 (step S55). This predetermined opening degree γ may be set to an opening degree corresponding to a position slightly before the valve element 14 contacts with the seal part 21*a*, i.e., in the order of 5 to 15°. In the present embodiment, the predetermined opening degree γ is set to 10°.

The controller 201 then takes the compressor pressure (Pin) of the compressor 172 and the stack pressure (pstack) (step S56) and calculates a front-rear differential pressure ΔPIN (=Pin−pstack) of the inlet sealing valve 174 (step S57). When this front-rear differential pressure ΔPIN is smaller than a predetermined pressure P (step S58: YES), the controller 201 performs the controlled fully-closed opening-degree control to adjust the opening degree of the inlet sealing valve 174 to a controlled fully-closed opening degree (step S59). Concretely, the controller 201 controls the motor 32 to close the inlet sealing valve 174 to the controlled fully-closed opening degree α. Thus, the opening degree of the inlet sealing valve 174 is changed from the predetermined opening degree γ to the controlled fully-closed opening degree α.

The controlled fully-closed opening degree α is an opening degree which is slightly larger than the mechanical fully-closed opening degree (Opening degree=0°) and at which the valve element 14 is maintained in the valve-closed state in contact with the seal part 21a; for example, the opening degree α may be set to several degrees. In the present embodiment, the controlled fully-closed opening degree α is set to 30. The predetermined pressure P may be set to a pressure value (about several kPa) under which the seal part 21a of the rubber seat 21 is never deformed.

At that time, since the bypass valve 191 has been fully opened, the front-rear differential pressure ΔPIN of the inlet sealing valve 174 is basically small. However, for a bypass valve 191 having a small valve hole, for example, it takes time from when the bypass valve 191 is opened until the front-rear differential pressure ΔPIN of the inlet sealing valve 174 becomes small. This may cause the inlet sealing valve 174 to be adjusted to the controlled fully-closed opening degree α before the front-rear differential pressure ΔPIN of the inlet sealing valve 174 decreases. Thus, the inlet sealing valve 174 may be brought into the controlled fully-closed state while the seal part 21a remains deformed.

Therefore, when the inlet sealing valve 174 is to be brought into the controlled fully-closed state, the inlet sealing valve 174 is firstly closed to a predetermined opening degree γ, as mentioned above and, after the front-rear differential pressure ΔPIN of the inlet sealing valve 174 becomes smaller than the constant pressure P, the controlled fully-closed opening-degree control is performed. This can reliably avoid the inlet sealing valve 174 from being brought into the controlled fully-closed state while the seal part 21a remains deformed.

Thereafter, the controller 201 determines whether or not the opening degree of the inlet sealing valve 174 subjected to the controlled fully-closed opening-degree control executed in step S59 has reached the controlled fully-closed opening degree α (step S60). When it is confirmed that the opening degree of the inlet sealing valve 174 has reached the controlled fully-closed opening degree α (step S60: YES), the controller 201 sets a controlled fully-closed flag of the inlet sealing valve 174 to 1 (step S61) and performs the full-closing control to fully close the bypass valve 191 from the fully-opened state (step S62). Thus, the compressor pressure of the compressor 172 acts on the seal part 21a of the inlet sealing valve 174, thereby pressing the seal part 21a against the valve element 14. Therefore, the inlet sealing valve 174 can enhance the sealing performance even when the opening degree is controlled to the controlled fully-closed opening degree α. Accordingly, when supply of air to the fuel cell stack 111 is stopped during deceleration, even when the inlet sealing valve 174 is brought into the controlled fully-closed state without being mechanically fully closed, the inlet sealing valve 174 can seal the air.

Figure 30:
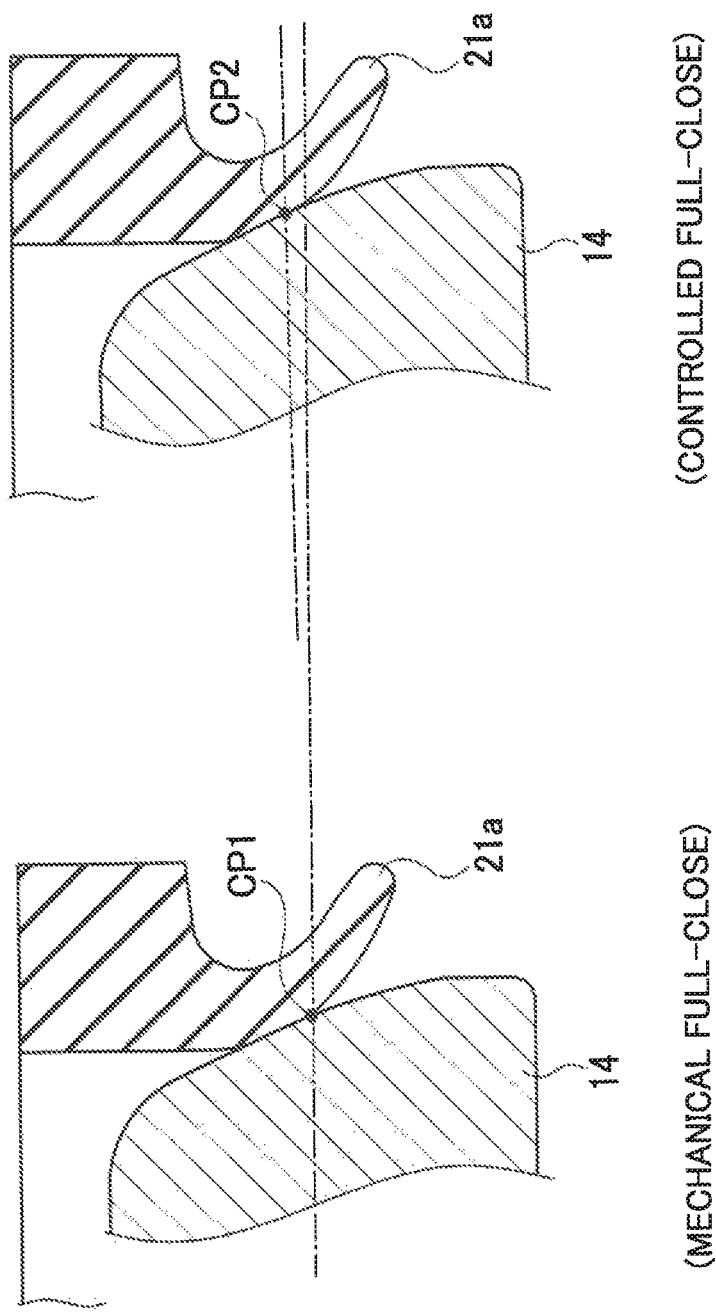
FIG. 30 is a view showing a contact state between the valve element and the seal part in each of a mechanical fully-closed state and a controlled fully-closed state.

In the inlet sealing valve 174, as described above, the fully-closed opening degree (controlled fully-closed opening degree) during deceleration is different from the fully-closed opening degree (mechanical fully-closed opening degree) during system stop. Therefore, as shown in FIG. 30, the position of a contact point CP1 between the valve element 14 and the seal part 21a in the mechanical fully-closed opening degree state during system stop and the position of a contact point CP2 between the valve element 14 and the seal part 21a in the controlled fully-closed opening degree state during deceleration are different from each other. During deceleration in which the inlet sealing valve 174 is fully closed in large number of times, the seal part 21a may be worn away at the fully-closed opening degree position (the controlled fully-closed opening degree position: Opening degree θ=α). However, such wear of the seal part 21a can be greatly reduced at the fully-closed opening degree position (the mechanical fully-closed opening degree position: Opening degree θ=0) during system stop in which the inlet sealing valve 174 is less operated as compared with during deceleration. Accordingly, the inlet sealing valve 174 can enhance the sealing performance during system stop. In the inlet sealing valve 174, even when the seal part 21a is worn away at the controlled fully-closed opening degree position, the seal part 21a is pressed against the valve element 14 by the compressor pressure of the compressor 172 during deceleration. Thus, high sealing performance can be achieved.

When the discharge request is present (step S80: YES), as shown in FIG. 28, the controller 201 takes the compressor pressure (Pin) and the compressor revolution number (cprpm) of the compressor 172 (step S81). The controller 201 then determines whether or not the compressor pressure (Pin) is smaller than a discharge target pressure A (Pin<A) (step S82). When the compressor pressure (Pin) is smaller than the discharge target pressure A (step S82: YES), the controller 201 controls the bypass valve 191 to close to increase the compressor pressure (Pin) (step S83). When the compressor pressure (Pin) is equal to or larger than the discharge target pressure A (step S82: NO), the controller 201 controls the bypass valve 191 to open to decrease the compressor pressure (Pin) (step S84).

The controller 201 then determines whether or not the compressor revolution number (cprpm) is smaller than the discharge target revolution number B (cprpm<B) (step S85). When the compressor revolution number (cprpm) is smaller than the discharge target revolution number B (step S85: YES), the controller 201 increases the revolution number of the compressor 172 (step S86). When the compressor revolution number (cprpm) is equal to or larger than the discharge target revolution number B (step S85: NO), the controller 201 decreases the revolution number of the compressor 172 (step S87).

By the aforementioned discharge control, it is possible to control the compressor pressure and the compressor revolution number respectively to around the discharge target pressure A and around the discharge target revolution number B to thereby cause the compressor 172 to efficiently discharge surplus electric power generated in the fuel cell stack 111.

In contrast, when the discharge request is absent, that is, when charging of the battery is enabled (step S80: NO), the controller 201 sets the discharge release flag to 1 (step S88). The controller 201 then determines whether an AUXS power-generation request is absent (step S90). When the AUXS power-generation request is absent (step S90: YES), the controller 201 performs the regenerative brake control, and opens the bypass valve 191 and controls the revolution number of the compressor 172 according to the regenerative brake request in order to charge the electric power generated in the fuel cell stack 111 to the battery. Since the bypass valve 191 is open, even when the compressor 172 is maintained at the constant revolution number, the load (power consumption) of the compressor 172 is low.

When the AUXS power-generation request is not absent, i.e. is present (step S90: NO), the controller 201 determines whether or not the controlled fully-closed flag is 0 (step S92). When the controlled fully-closed flag of the inlet sealing valve 174 is 0 (step S92: YES), the controller 201 controls the opening degree of the outlet integration valve 181 and the opening degree of the bypass valve 191 individually and also controls the revolution number of the compressor 172 according to the AUXS power-generation request (step S93). When the controlled fully-closed flag of the inlet sealing valve 174 is 1 (step S92: NO), the processings in step S70 and subsequent steps which will be described later are performed.

Returning to FIG. 27, when the acceleration/steady state is maintained or when deceleration is terminated (step S51: NO), as shown in FIG. 29, the controller 201 determines whether or not the controlled fully-closed flag of the inlet sealing valve 174 is 1 (step S70). When the controlled fully-closed flag is 1 (step S70: YES), return control from the deceleration control is performed. Specifically, the controller 201 executes the full-opening control to fully open the bypass valve 191 from the fully-closed state (step S71). At that time, the outlet integration valve 181 continuously undergoes the controlled fully-closed opening-degree control (step S72). If the processing in step S54 is omitted, the processing in step S72 is unnecessary.

Figure 31:
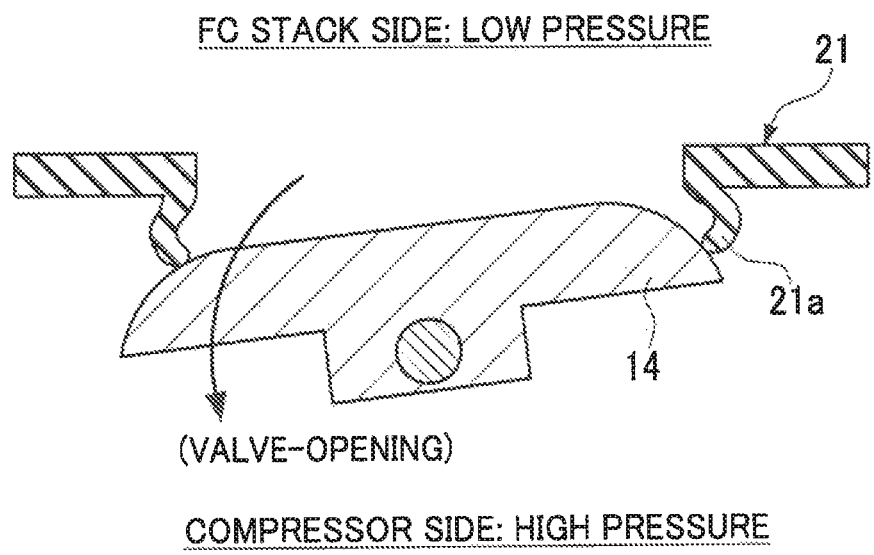
FIG. 31 is a view showing a state of a rubber seat with a seal part bent back during valve-opening.

At that time, when the front-rear differential pressure ΔPIN of the inlet sealing valve 174 is high, the seal part 21a of the rubber seat 21 may be bent back and deformed by the differential pressure. If the seal part 21a of the rubber seat 21 is bent or curled back in the course of opening the inlet sealing valve 174 as shown in FIG. 31, the seal part 21a may be abnormally worn away. If the seal part 21a is abnormally worn away, the inlet sealing valve 174 cannot enhance the sealing performance during full-closing.

Therefore, the controller 201 takes the compressor pressure (Pin) of the compressor 172 and the stack pressure (pstack) (step S73) and calculates the front-rear differential pressure ΔPIN (=Pin−pstack) of the inlet sealing valve 174 (step S74). When the front-rear differential pressure ΔPIN is smaller than a predetermined pressure P (step S75: YES), the controller 201 performs the full-opening control to adjust the opening degree of the inlet sealing valve 174 from the controlled fully-closed opening degree to a fully-opened opening degree (step S76). Thereafter, the controller 201 sets the controlled fully-closed flag of the inlet sealing valve 174 to 0 (step S77) and sets the discharge release flag to 0 (step S78).

Accordingly, the inlet sealing valve 174 is opened after the front-rear differential pressure ΔPIN of the inlet sealing valve 174 becomes small as above. This can reliably prevent the seal part 21a of the rubber seat 21 from being bent back and deformed during valve-opening of the inlet sealing valve 174. Therefore, when the inlet sealing valve 174 is to be opened after completion of deceleration, the inlet sealing valve 174 can prevent abnormal wear of the seal part 21a of the rubber seat 21 and thus can enhance the sealing performance of the inlet sealing valve 174.

When the controlled fully-closed flag is 0, that is, when the acceleration/steady state is maintained (step S70: NO), the inlet sealing valve 174 is kept in the fully-opened position. The controller 201 individually controls the opening degree of the outlet integration valve 181 and the opening degree of the bypass valve 191 according to the output (acceleration/steady) request at that time and also controls the revolution number of the compressor 172 (step S79).

Returning to FIG. 27, when the operation request of the fuel cell stack 111 is not continued, that is, when a system stop request is present (step S50: NO), the controller 201 executes the processings in step S100 and subsequent steps to stop the fuel cell system 101.

Figure 32:
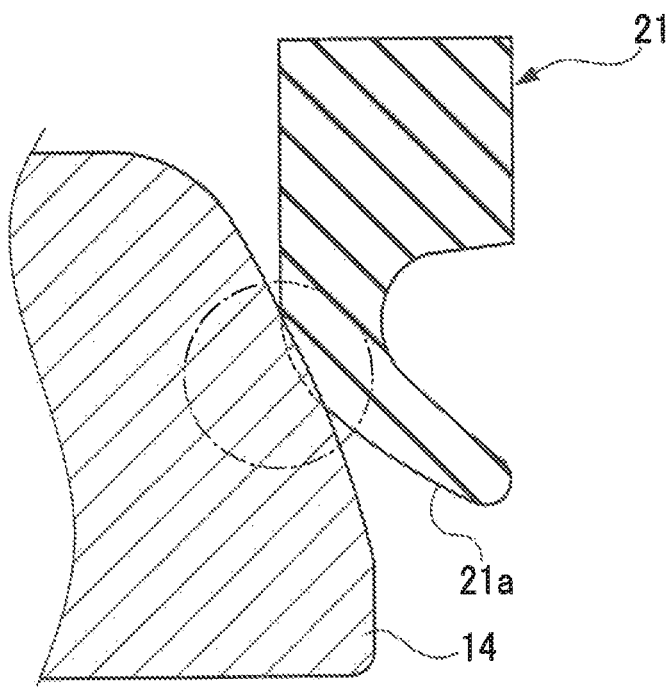
FIG. 32 is a view showing a manner that the valve element contacts with and slides on the seal part when controlled full-closing opening-degree control is executed.
Figure 33:
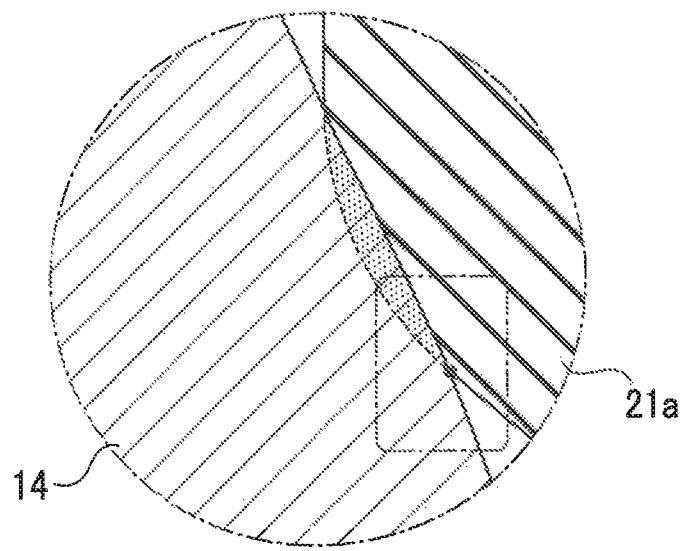
FIG. 33 is an enlarged view of a part circled with a dashed line in FIG. 32.
Figure 34:
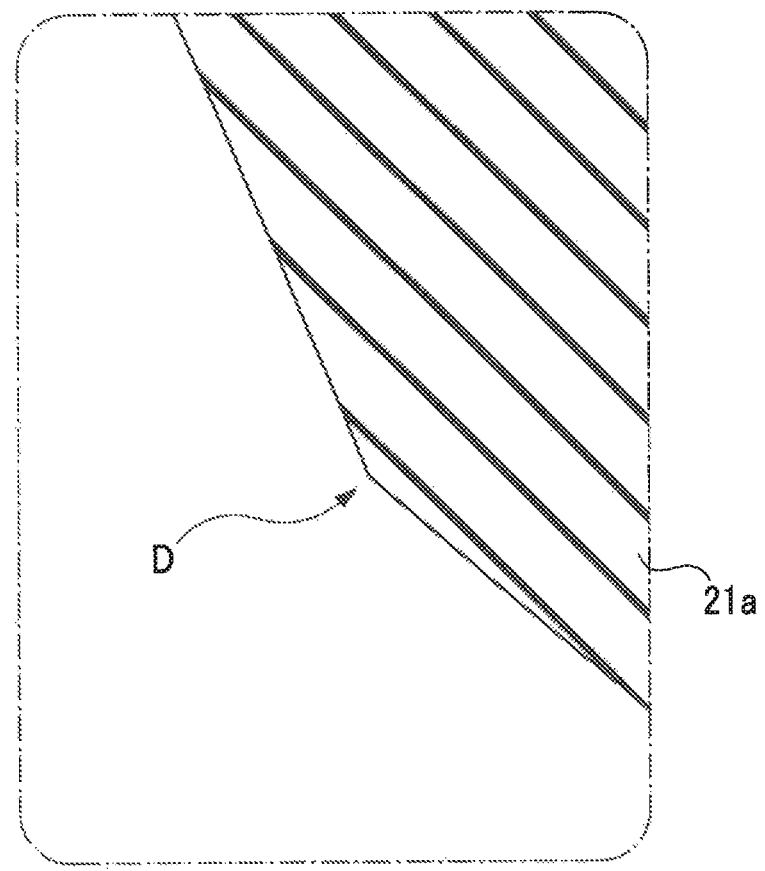
FIG. 34 is an enlarged view of a part boxed with a dashed line in FIG. 33.

Herein, when the controlled fully-closed opening-degree control is performed during deceleration, the number of times the valve element 14 slides on the seal part 21a is greatly increased at a controlled fully-closed opening degree position during deceleration shown in FIG. 32 than at a mechanical fully-closed opening degree position during system stop. Therefore, as shown in FIG. 33, a portion (hatched portion) of the seal part 21a that contacts and slides with respect to the valve element 14 at the controlled fully-closed opening degree position is worn away, which may cause a wear step or ridge 1D to be formed in the seal part 21a as shown in FIG. 34. When the wear step D is formed in the seal part 21a, during system stop, the inlet sealing valve 174 may not be closed to the mechanical fully-closed opening degree (Opening degree=0°) only by the urging force (the return spring force Fs1) of the return spring 40.

Therefore, when the system is to be stopped, the controller 201 performs the zero-opening control described below on the inlet sealing valve 174 to reliably bring the inlet sealing valve 174 to a fully-closed state (a mechanical fully-closed opening degree) during system stop.

Specifically, the controller 201 executes the full-opening control to fully open the bypass valve 191 from the fully-closed state (step S100). The controller 201 further performs the zero-opening control to control the motor 32 to forcibly adjust the opening degree of the inlet sealing valve 174 to 0° to thereby bring the inlet sealing valve 174 to a fully-closed (a mechanical fully-closed) state (step S101). Similarly, the outlet integration valve 181 is subjected to the zero-opening control to be fully closed (step S102).

Subsequently, the controller 201 stops the compressor 172. When the revolution number becomes 0 (zero) (step S103: YES), the controller 201 performs the full-closing control to operate the bypass valve 191 from full open to full close (step S104) and stops the fuel cell system 101 (step S105).

Since the fuel cell system 101 is stopped as above, even when a wear step D occurs in the seal part 21a, the inlet sealing valve 174 can be reliably closed to the mechanical fully-closed opening degree by the motor 32. Further, the seal part 21a can be greatly suppressed from wearing away at the mechanical fully-closed position as described above. Accordingly, the inlet sealing valve 174 can enhance the sealing performance during system stop. In the present embodiment, furthermore, the outlet integration valve 181 is also configured to perform the zero-opening control as with the inlet sealing valve 174. Thus, the outlet integration valve 181 can also enhance the sealing performance during system stop. The seal-off degree of the fuel cell stack 111 during system stop can be enhanced. Thus, the reaction in the fuel cell stack 111 is less likely to occur and the deterioration due to oxidation in the fuel cell stack 111 can be suppressed.

Figure 35:
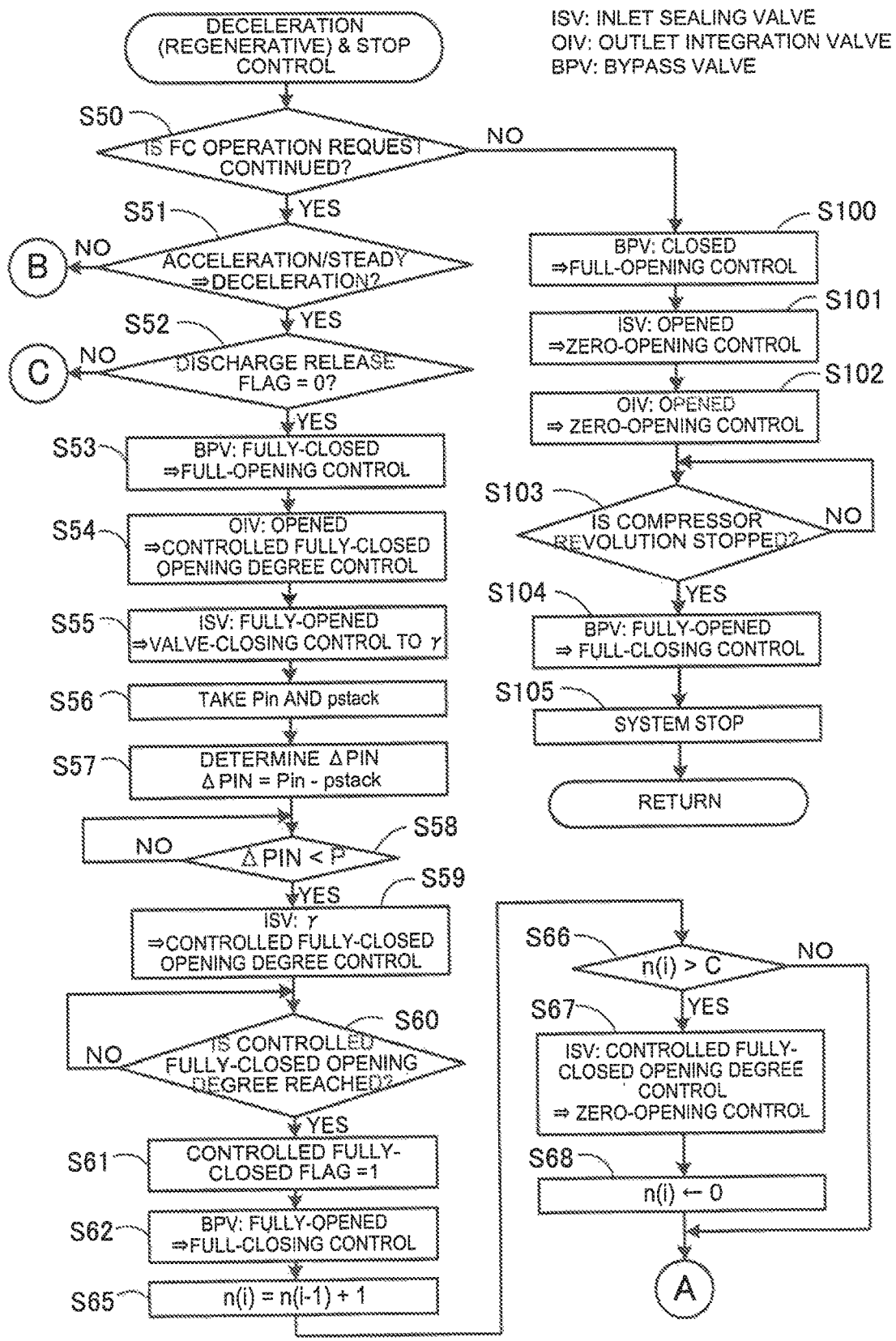
FIG. 35 is a flowchart showing contents of step-generation preventing control.

Herein, for the purpose of preventing the occurrence of a wear step in the seal part 21a, the controller 201 may further perform a wear step-generation preventing control described below during deceleration. Specifically, as shown in FIG. 35, the controller 201 executes the controlled fully-closed opening-degree control on the inlet sealing valve 174 during deceleration (steps S50 to S62) and then counts up an execution-times counter n(i) for counting up the number of times the controlled fully-closed opening-degree control is executed from system start-up (step S65). When the execution-times counter n(i) of the controlled fully-closed opening-degree control exceeds a predetermined number of times C (step S66: YES), the controller 201 performs the zero-opening control on the inlet sealing valve 174 (step S67) and resets the execution-times counter n(i) (step S68). In contrast, when the execution-times counter n(i) of the controlled fully-closed opening-degree control does not exceed the predetermined number of times C (step S66: NO), the controller 201 performs the processing in step S80 without executing the processings in steps S67 and S68.

The predetermined number of times C may be set to about several hundred times. This predetermined number of times C is different in optimal value according to different shapes of the rubber seats 21 or others. It is thus preferable to experimentally set the number of times in which the occurrence of a wear step can be effectively prevented.

In the fuel cell system 101, by executing the aforementioned controls, every after the inlet sealing valve 174 repeatedly undergoes the controlled fully-closed opening-degree control by the predetermined number of times, the zero-opening control is performed to forcibly adjust the opening degree of the inlet sealing valve 174 to 0°. This can suppress the generation of a wear step D in the seal part 21a.

The aforementioned embodiments are mere examples and give no limitation to the present disclosure. The present disclosure may be embodied in other specific forms without departing from the essential characteristics thereof. For instance, in the aforementioned embodiment, the rubber seat 21 is provided in the valve seat 13, but it may be instead provided in the valve element 14. As an alternative, furthermore, the rotary shaft 15 may be supported in both-ends-supported configuration by a bearing separately provided on an opposite side of the valve element 14 from the first bearing 37.

In the aforementioned fuel cell system, preferably, the downstream-side valve includes a valve seat including a valve hole and a seat surface formed at an edge of the valve hole; a valve element including an outer periphery formed with a seal surface corresponding to the seat surface; a rotary shaft integrally provided with the valve element to rotate the valve element; a drive mechanism configured to generate a driving force to rotate the rotary shaft in a valve opening direction; a driving force receiving part integrally provided with the rotary shaft and configured to receive the driving force; a bearing placed in a position between the valve element and the driving force receiving part in an extending direction of a central axis of the rotary shaft and configured to support the rotary shaft; and a return spring to generate a return spring force to rotate the rotary shaft in a valve closing direction, the central axis of the rotary shaft extends in parallel to a diameter direction of the valve element and is placed eccentrically from a center of the valve hole to a radial direction of the valve hole, and the seal surface is placed eccentrically from the central axis of the rotary shaft to a direction in which a central axis of the valve element extends, one of the valve seat and the valve element is provided with a seal member configured to seal between the valve element and the valve seat during non-operation of the drive mechanism, and the seal member includes a seal part having a shape that decreases surface pressure of a portion in contact with an other one of the valve element and the valve seat as an upstream-side pressure of the upstream-side valve becomes higher than a downstream-side pressure of the upstream-side valve.

With the above configuration, basically identical valves (which may differ in the structure of seal members) can be used for the upstream-side valve and the downstream-side valve. This can reduce cost of a fuel cell system and also simplify the valve opening and closing control to be executed by the controller.

In the aforementioned fuel cell system, preferably, the bypass valve includes a valve seat including a valve hole and a seat surface formed at an edge of the valve hole; a valve element including an outer periphery formed with a seal surface corresponding to the seat surface; a rotary shaft integrally provided with the valve element to rotate the valve element; a drive mechanism configured to generate a driving force to rotate the rotary shaft in a valve opening direction; a driving force receiving part integrally provided with the rotary shaft and configured to receive the driving force; a bearing placed in a position between the valve element and the driving force receiving part in an extending direction of a central axis of the rotary shaft and configured to support the rotary shaft; and a return spring to generate a return spring force to rotate the rotary shaft in a valve closing direction, the central axis of the rotary shaft extends in parallel to a diameter direction of the valve element and is placed eccentrically from a center of the valve hole to a radial direction of the valve hole, and the seal surface is placed eccentrically from the central axis of the rotary shaft to a direction in which a central axis of the valve element extends.

Since the upstream-side valve (the downstream-side valve) provided with no rubber seat is used as the bypass valve, commonality of the valves in the fuel cell system can be achieved. This can further reduce the cost of the fuel cell system and control each valve in cooperation. Thus, the valve opening and closing control to be executed by the controller can be further simplified.

In the aforementioned fuel cell system, preferably, the downstream-side valve is identical to the upstream-side valve and provided in the oxidant gas exhaust passage to decrease contact surface pressure between the seal part and the other one of the valve element and the valve seat as an upstream-side pressure of the downstream-side valve becomes higher than a downstream-side pressure of the downstream-side valve.

With the above configuration, identical valves can be used as the upstream-side valve and the downstream-side valve, which can further reduce the cost of the fuel cell system and also simplify the valve opening and closing control to be executed by the controller.

In the aforementioned fuel cell system, each of the downstream-side valve and the bypass valve may have a valve hole diameter smaller than a valve hole diameter of the upstream-side valve.

Since the upstream-side valve has a low-pressure loss request, the upstream-side valve needs a valve hole diameter of a predetermined diameter or more. In contrast, different from the upstream-side valve, the downstream-side valve and the bypass valve have no low-pressure loss request. Accordingly, the valve hole diameters of the downstream-side valve and the bypass valve can be designed to be smaller than the valve hole diameter of the upstream-side valve. Thus cost reduction in the outlet integration valve and the bypass valve can be promoted and hence the cost of the fuel cell system can be further reduced.

In the aforementioned fuel cell system, the valve hole diameter of the downstream-side valve may be equal to the valve hole diameter of the bypass valve.

Accordingly, the cost reduction in the downstream-side valve and bypass valve can be further promoted and the cost of the fuel cell system can be further reduced.

In the aforementioned fuel cell system, preferably, when supply of oxidant gas to the fuel cell is to be stopped during deceleration, the controller closes the upstream-side valve and opens the bypass valve and, after the upstream-side valve is fully closed, closes the bypass valve.

With the above configuration, while the seal member is in normal contact with the valve element or the valve seat, the pressure in the oxidant gas supply passage rises. This can reliably prevent the seal part of the seal member from being bent back during valve-closing of the upstream-side valve. Accordingly, during valve-closing of the upstream-side valve, the seal member can normally contact with the valve element or the valve seat without bending back in contacting with the valve element or the valve seat. When the supply of oxidant gas to a fuel cell is stopped during deceleration, therefore, the upstream-side valve can reliably seal the oxidant gas and thus reduce supply of surplus (unnecessary) oxidant gas to the fuel cell.

Herein, during deceleration which frequently occurs, when the upstream-side valve is fully closed in a similar manner during system stop, the seal member may be worn away. If the seal part of the seal member is worn away, it may be impossible to enhance the sealing performance in the upstream-side valve during system stop.

Therefore, the aforementioned fuel cell system, preferably, when the upstream-side valve is to be fully closed during deceleration, the controller executes controlled fully-closed opening-degree control to cause the drive mechanism to bring the upstream-side valve into a controlled fully-closed opening degree larger than a mechanical fully-closed opening degree corresponding to an opening degree of 0°.

With the above configuration, when fully closing the upstream-side valve during deceleration, the controller executes the controlled fully-closed opening-degree control to cause the drive mechanism to adjust the opening degree of the upstream-side valve to a controlled fully-closed opening degree larger than a mechanical fully-closed opening degree (Opening degree=0°). The controlled fully-closed opening degree represents an opening degree of the valve element opened by an angle of several degrees from the mechanical fully-closed opening degree and corresponds to an opening degree at which the valve-closed state is maintained with the seal member contacting with the valve element or the valve seat. Accordingly, in the upstream-side valve, the fully-closed opening degree position (a mechanical fully-closed opening degree position) during system stop and the fully-closed opening degree position (a controlled fully-closed opening degree position) during deceleration are different from each other. The fully-closed opening degree position during deceleration is positioned to a more open side than the fully-closed opening degree position specified during system stop. Therefore, it is possible to greatly prevent wear of the seal member at the fully-closed opening degree position during system stop in which the number of operation times for valve-closing is very smaller than that during deceleration. Thus, the upstream-side valve can provide high sealing performance during system stop.

When the fully-closed state is changed between during deceleration and during system stop, the amount of wear of the seal member is different between at the controlled fully-closed opening degree position and the mechanical fully-closed opening degree position, that is, the wear amount of the seal member at the controlled fully-closed opening degree position is more than at the mechanical fully-closed opening degree position. This may cause a wear step to be formed in the seal member. If such wear step is present in the seal member, the upstream-side valve may not be closed to the mechanical fully-closed opening degree by only the urging force of the return spring during system stop.

Therefore, in the aforementioned fuel cell system, preferably, when the system is to be stopped, the controller executes zero-opening control to cause the drive mechanism to adjust the opening degree of the upstream-side valve to the mechanical fully-closed opening degree and then stop a system.

With the above configuration, when stopping the system, the zero-opening control is performed to cause the drive mechanism to forcibly adjust the opening degree of the upstream-side valve to the mechanical fully-closed opening degree (Opening degree=0°) and then the system is stopped. Therefore, even when the wear step is formed in the seal member, the upstream-side valve can be reliably closed to the mechanical fully-closed opening degree. Thus, the upstream-side valve can enhance sealing performance during system stop.

In the aforementioned fuel cell system, preferably, when a number of execution times the controlled fully-closed opening-degree control is executed exceeds a predetermined number of times, the controller performs zero-opening control to cause the drive mechanism to forcibly bring the upstream-side valve into the mechanical fully-closed opening degree.

With the above configuration, every after the controlled fully-closed opening-degree control for adjusting the opening degree of the upstream-side valve to the controlled fully-closed opening degree is repeatedly performed by a predetermined number of times, the zero-opening control is executed to forcibly adjust the opening degree of the upstream-side valve to the mechanical fully-closed opening degree (Opening degree=0°). This can prevent the occurrence of a wear step in the seal member. The predetermined number of times may be set to about several hundred times, but it is preferable to experimentally set an optimal number of times in which the occurrence of a wear step can be prevented in consideration of the material and the shape of the seal member.

Furthermore, In the aforementioned fuel cell system, preferably, when the upstream-side valve is to be fully closed during deceleration, the controller closes the upstream-side valve to a predetermined opening degree larger than the controlled fully-closed opening degree and, after a front-rear differential pressure of the upstream-side valve becomes smaller than a constant pressure, performs the controlled fully-closed opening-degree control.

When fully closing the upstream-side valve, if the front-rear differential pressure of the upstream-side valve remains high, this high differential pressure may cause the seal member to be deformed. If the controlled fully-closed opening-degree control is performed while the seal part is deformed, the upstream-side valve may be adjusted to the controlled fully-closed opening degree with the seal part remaining deformed. For instance, when the bypass valve has a small valve hole diameter, it takes time from when the bypass valve is opened until the front-rear differential pressure of the upstream-side valve becomes small. This may cause the upstream-side valve to be brought into the controlled fully-closed opening degree before the front-rear differential pressure of the upstream-side valve decreases. The seal part may thus be deformed and the sealing performance may not be enhanced.

Therefore, when the upstream-side valve is to be fully closed, the upstream-side valve is closed to the predetermined opening degree larger than the controlled fully-closed opening degree and, after the front-rear differential pressure of the upstream-side valve becomes the constant pressure or lower, the controlled fully-closed opening-degree control is performed. Accordingly, it is possible to reliably avoid the upstream-side valve from being brought into the controlled fully-closed opening degree while the seal member remains deformed. This can prevent deformation of the seal part and thus enhance the sealing performance. The predetermined opening degree larger than the controlled fully-closed opening degree may be set to a minimum opening degree (e.g., in the order of 5° to 15°) whereby the valve element or the valve seat can be maintained in a non-contact relation with the seal member. The constant pressure may be set to a pressure (about several kPa) under which the seal part of the seal member is not deformed.

Similarly, when opening the upstream-side valve after termination of deceleration, if the front-rear differential pressure of the upstream-side valve is high, this high differential pressure may cause the seal part of the seal member to be bent back and deformed. When the seal part of the seal member is bent back while the upstream-side valve is in an open state, the seal part may be abnormally worn away, which cannot enhance sealing performance.

Therefore, in the aforementioned fuel cell system, preferably, when the upstream-side valve is to be opened after termination of deceleration, the controller opens the bypass valve and then opens the upstream-side valve to a fully-opened state.

With the above configuration, after the pressure in the oxidant gas supply passage decreases, that is, after the front-rear differential pressure of the upstream-side valve becomes small, the upstream-side valve is opened. Accordingly, it is possible to prevent the seal part of the seal member from being bent back and deformed during valve-opening of the upstream-side valve. This can prevent abnormal wear of the seal part of the seal member, enhancing the sealing performance, when the upstream-side valve is opened after the end of deceleration.

In this case, in the aforementioned fuel cell system, preferably, the controller opens the upstream-side valve to the fully-opened state after the front-rear differential pressure of the upstream-side valve becomes smaller than a constant pressure.

With the above configuration, it is possible to reliably avoid the seal part of the seal member from being bent back when the upstream-side valve is opened after the end of deceleration. The constant pressure may be set to a pressure (about several kPa) under which the seal part of the seal member is not deformed.

REFERENCE SIGNS LIST

2 Valve section
3 Drive mechanism section
11 Passage
13 Valve seat
14 Valve element
15 Rotary shaft
21 Rubber seat
21a Seal part
32 Motor
37 First bearing
38 Second bearing
40 Return spring
41 Main gear
101 Fuel cell system
111 Fuel cell stack (Fuel cells)
113 Air system
161 Air supply passage
162 Air exhaust passage
163 Bypass passage
172 Compressor
174 Inlet sealing valve
181 Outlet integration valve
191 Bypass valve
201 Controller

What is claimed is:

1. A fuel cell system for use in a fuel cell vehicle, the fuel cell system comprising:
    a fuel cell;
    an oxidant gas supply passage for supplying oxidant gas to the fuel cell;
    a compressor provided in the oxidant gas supply passage and configured to supply the oxidant gas to the fuel cell;
    an upstream-side valve provided in the oxidant gas supply passage between the compressor and the fuel cell;
    an oxidant gas exhaust passage for exhausting the oxidant gas supplied to the fuel cell;
    a downstream-side valve provided in the oxidant gas exhaust passage;
    a bypass passage connected to the oxidant gas supply passage and the oxidant gas exhaust passage;
    a bypass valve provided in the bypass passage and configured to control a flow rate of the oxidant gas to be allowed to flow in the bypass passage; and
    a controller configured to close the upstream-side valve and, before closing control of the upstream-side valve is completed, open the bypass valve, when supply of oxidant gas to the fuel cell is to be stopped during deceleration of the fuel cell vehicle.

2. The fuel cell system according to claim 1, wherein the upstream-side valve includes:
    a valve seat including a valve hole and a seat surface formed at an edge of the valve hole;
    a valve element including an outer periphery formed with a seal surface corresponding to the seat surface;
    a rotary shaft integrally provided with the valve element to rotate the valve element;
    a drive mechanism configured to generate a driving force to rotate the rotary shaft in a valve opening direction;
    when the upstream-side valve is to be fully closed during the deceleration, the controller is configured to execute controlled fully-closed opening-degree control to cause the drive mechanism to bring the upstream-side valve into a controlled fully-closed opening degree larger than a mechanical fully-closed opening degree corresponding to an opening degree of 0°.

3. The fuel cell system according to claim 2, wherein when the system is to be stopped, the controller is configured to execute zero-opening control to cause the drive mechanism to adjust the opening degree of the upstream-side valve to the mechanical fully-closed opening degree and then stop a system.

4. The fuel cell system according to claim 2, wherein when a number of execution times the controlled fully-closed opening-degree control is executed exceeds a predetermined number of times, the controller is configured to perform zero-opening control to cause the drive mechanism to forcibly bring the upstream-side valve into the mechanical fully-closed opening degree.

5. The fuel cell system according to claim 2, wherein when the upstream-side valve is to be fully closed during deceleration, the controller is configured to close the upstream-side valve to a predetermined opening degree larger than the controlled fully-closed opening degree and, after a front-rear differential pressure of the upstream-side valve becomes smaller than a constant pressure, perform the controlled fully-closed opening-degree control.

6. The fuel cell system according to claim 1, wherein when the upstream-side valve is to be opened after termination of the deceleration, the controller is configured to open the bypass valve and then open the upstream-side valve to a fully-opened state.

7. The fuel cell system according to claim 6, wherein the controller is configured to open the upstream-side valve to the fully-opened state after the front-rear differential pressure of the upstream-side valve becomes smaller than a constant pressure.

8. The fuel cell system according to claim 1, wherein the controller is configured to close the bypass valve after the upstream-side valve is fully closed.

\* \* \* \* \*